(12) United States Patent
Mahdavi et al.

(10) Patent No.: US 9,342,631 B2
(45) Date of Patent: May 17, 2016

(54) USER INTERFACES FOR DESIGNING OBJECTS

(75) Inventors: Siavash Haroun Mahdavi, London (GB); Assa Ashuach, London (GB); Nicolas De Cordes, Brussels (BE)

(73) Assignee: Digital Forming Ltd., London (GB)

( * ) Notice: Subject to any disclaimer, the term of this patent is extended or adjusted under 35 U.S.C. 154(b) by 909 days.

(21) Appl. No.: 13/505,935

(22) PCT Filed: Nov. 4, 2010

(86) PCT No.: PCT/GB2010/051846
§ 371 (c)(1),
(2), (4) Date: Jul. 19, 2012

(87) PCT Pub. No.: WO2011/055144
PCT Pub. Date: May 12, 2011

(65) Prior Publication Data
US 2012/0281013 A1 Nov. 8, 2012

Related U.S. Application Data

(60) Provisional application No. 61/257,989, filed on Nov. 4, 2009.

(51) Int. Cl.
*G06F 17/00* (2006.01)
*G06F 19/00* (2011.01)
(Continued)

(52) U.S. Cl.
CPC .............. *G06F 17/50* (2013.01); *G06T 19/00* (2013.01); *G06F 2217/04* (2013.01); *G06F 2217/06* (2013.01)

(58) Field of Classification Search
CPC . G06F 17/50; G06F 17/5009; G06F 19/3406; G06Q 10/06
See application file for complete search history.

(56) References Cited

U.S. PATENT DOCUMENTS

2004/0197728 A1* 10/2004 Abolfathi et al. ............... 433/24
2006/0129261 A1 6/2006 Morita et al.
(Continued)

FOREIGN PATENT DOCUMENTS

JP 2002-41907 A 2/2002
JP 2006155601 6/2006

OTHER PUBLICATIONS

Notification of Reason(s) of Refusal dated Jun. 10, 2014 for Japanese Patent Application No. 2012-537448.
(Continued)

*Primary Examiner* — Matthew Salvucci
(74) *Attorney, Agent, or Firm* — Knobbe Martens Olson & Bear, LLP

(57) ABSTRACT

A collaborative method of generating a design representation of an object between a first user and a second user is described. The method comprises: designating, at a first user terminal, a set of design object variables relating to different aspects of the design representation; specifying, at the first user terminal, constraints for the set of design object variables, the constraints comprising a range of first user designated values for each of the designated object variables of the set; receiving at a second user terminal, the set of design object variables, the constraints for the set and the design representation via a communication network; enabling, at the second user terminal, manipulation of the design object representation, the enabling step comprising enabling selection of a particular value of at least one of the designated object variables only within the constrained value range specified by the first user; and presenting on the second user terminal a graphical representation of the design object representation as specified by the second user selection.

21 Claims, 15 Drawing Sheets

(51) Int. Cl.
  *G06Q 10/00* (2012.01)
  *G06F 17/50* (2006.01)
  *G06T 19/00* (2011.01)

(56) References Cited

U.S. PATENT DOCUMENTS

2007/0013709 A1\* 1/2007 Charles et al. ............... 345/581
2009/0196475 A1\* 8/2009 Demirli et al. ............... 382/128

OTHER PUBLICATIONS

Chinese Office Action dated Jul. 16, 2014 for Chinese Patent Application No. 201080053807.1.

International Search Report for International Application No. PCT/GB/2010/051846 mailed on May 2, 2011 in 7 pages.

Written Opinion of the International Searching Authority for International Application No. PCT/GB/2010/051846 mailed on May 2, 2011 in 17 pages.

Horvath et al., "Human intent models in integrated product modeling," Industrial Electronics Society, 2000, IECON 2000, 26$^{th}$ Annual Conference NCE of the IEEE Oct. 22-28, 2000, vol. 2, pp. 1274-1279.

Sohrt W. et al., "Interaction with Constraints in 3D Modeling," Proceedings, Symposium on Solid Modeling Foundations and CAD/CAM Applications, Jun. 5, 1991, pp. 387-396.

\* cited by examiner

```
WEBHEADER
{
Volume 119.996 180.717 206.45
Color 0 255 255
Surface Neon
}
HEADER
{
SourceModel blob.ostl        ← 72
}
VERTEXGROUPS
{
VertexList 0 220 0 1 2 3 4 5 6 7 8 9 10 11 12 13 14 17 18 19 20 25 26 27 34 35 45 46 47 48 49 50 51 52 53 54 55 56 57 58 59 60
61 62 63 64 65 71 72 81 82 83 84 85 86 87 88 89 90 91 92 93 94 95 96 97 98 99 100 552 558 559 584 585 589 590 591 592
VertexList 1 318 27 35 43 44 50 52 53 54 55 56 57 58 59 60 61 62 63 64 65 66 67 68 69 70 71 72 73 74 75 76 77 78 79 80 87 91
92 93 96 97 98 99 100 101 102 103 104 105 106 107 108 109 110 111 112 113 114 556 557 558 559 560 561 562 563 564 565
566 567 568 569 570 571 572 573 574 575 576 577 578 579 581 582 583 584 585 587 588 589 590 591 592 593 594 595 597 598
602 621 622 623 624
VertexList 2 172 137 143 144 148 149 150 151 152 165 168 169 170 174 175 176 177 201 202 203 204 208 209 210 211 212 213
216 217 218 219 220 221 222 223 251 258 259 264 265 266 267 282 288 295 604 605 608 609 610 611 614 615 616 617 618 621
622 623 624 625 626 627 628 629 630 631 632 633 634 635 636 637 638 639 640 641
}
MODIFIERCONSTRAINTS
{
DYNAMICSKIN
Group 0
Models 1
Model blob.ostl
SelectedModel 0
Explosion -350 284.579
Scale 0.1 0.1 0.1 0.915888 0.915888 0.915888
Rotation -92.5234 -180 -180 50.4673 146.355 146.355
ExplosionFinal 22.8972
ScaleFinal 0.175701 0.184112 0.55
RotationFinal 3.36448 0 0
ScaleLock 0 0 0
RotationLock 1 0 0
ExplosionLock 1

SOFTPOLY
Group 1
Explosion -50 40.6542
Scale 0 0 0 1.81308 1.81308 1.81308
Rotation -180 -180 -180 146.355 146.355 146.355
ExplosionFinal 10.7477
ScaleFinal 1.53271 1.57944 1
RotationFinal 0 0 1.68224
KernelRotation 0 -1 -1
KernelScaling -20.4123 2.79873 1
ScaleLock 0 0 0
RotationLock 0 0 0
MoveLock 229 0 0
ExplosionLock 0

SOFTPOLY
Group 2
Explosion -50 40.6542
Scale 0 0 0 1.81308 1.81308 1.81308
Rotation -180 -180 -180 146.355 146.355 146.355
ExplosionFinal 20.5607
ScaleFinal 1 1 1
RotationFinal 0 0 0
KernelRotation 0 -1 -1
KernelScaling 0 0 1
ScaleLock 0 0 0
RotationLock 0 0 0
MoveLock 37 2 0
ExplosionLock 0
}
```

Figure 3a

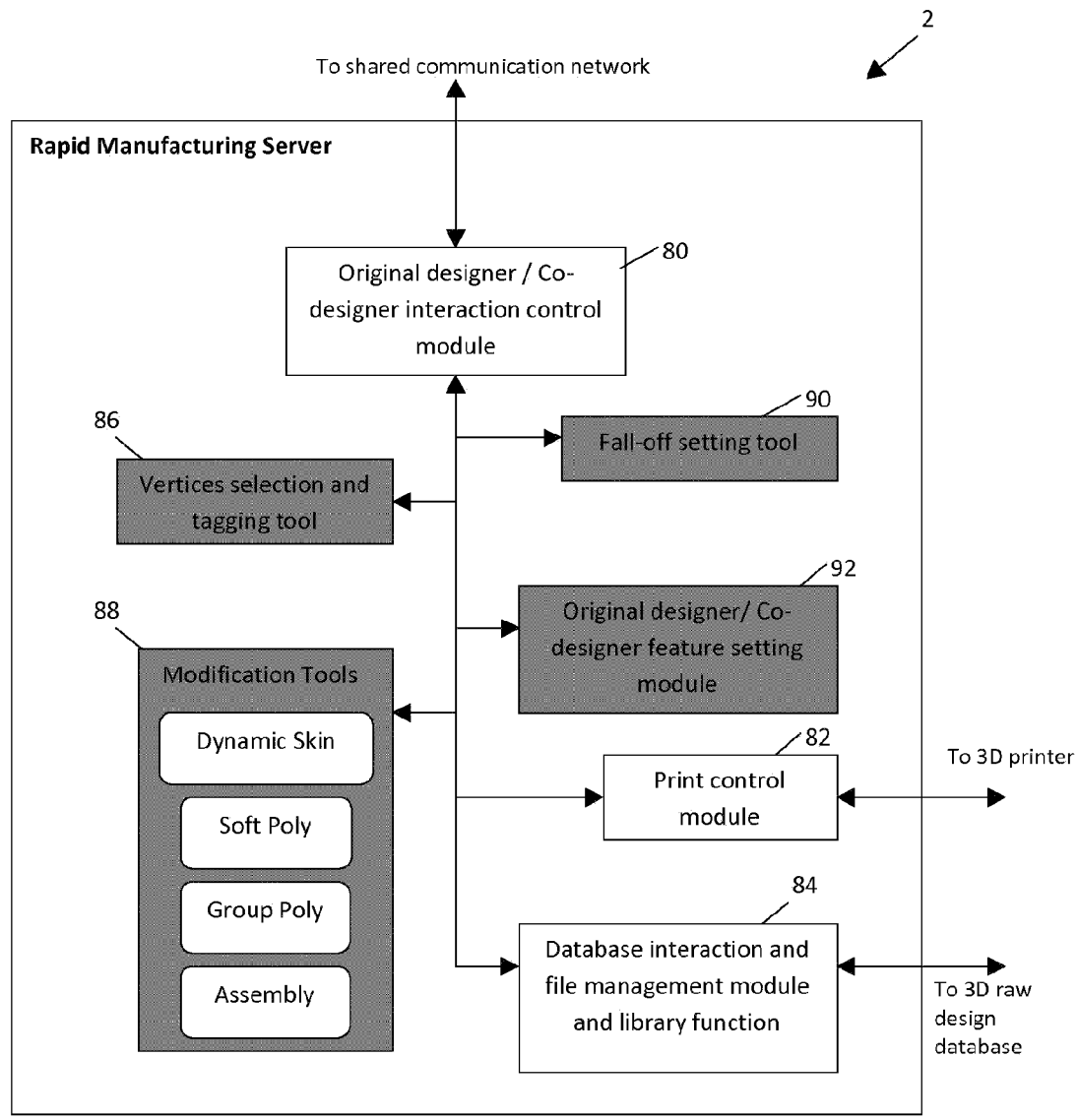
Figure 3b
 = optional modules provided for web service embodiment

USER INTERFACES FOR DESIGNING OBJECTS

FIELD OF THE INVENTION

The present invention concerns improvements relating to user interfaces for designing objects, and more specifically though not exclusively to an improved process for the cooperative design of industrially manufactured objects. The present invention also concerns enhanced new ways of image manipulation for the purposes of altering industrial designs and controlling such alteration to preserve the function of the article being designed.

BACKGROUND OF THE INVENTION

Current Computer-Aided Design software packages range from two-dimensional (2D) vector-based drafting systems to three-dimensional (3D) solid and surface modelling systems. Existing 3D Computer Aided Design (CAD) packages (such as AutoCAD and QCAD) are available for designing industrial objects of manufacture. Typically, a designer familiar with such packages uses them to design a particular industrial object for mass production. Modifications can be made during the design process and these are visualised within the CAD package often as a three-dimensional wireframe object.

Such packages are used by either individual designers working by themselves or if collaboration happens, then it is on a level playing field, i.e. both designers have equal access for the modification and enhancement of the modelled geometry. Thus, there is no ability for one designer to have a greater degree of control on the design than the other. Also for this, both designers are required to have a similar ability to be able to use existing CAD packages to express their modifications of the article under design. This requires a working knowledge of the CAD package which can exclude a significantly large number of designers who do not have the requisite CAD package knowledge.

Each 3D CAD object representation is comprised of thousands of interconnected vertices which form polygons, commonly referred to as a 3D polygon mesh. These vertices each have to be manipulated in order to effect changes in the design of the object. The vertices define the shape and orientation of the surface of the object and features within the surface of the object. The computational power required to manipulate these representations is significant as any transform is applied to all vertices of the object. The effect of this large-power requirement is that either rendering the image takes a considerable amount of time or the computing hardware required for faster image rendering significantly increases cost.

SUMMARY OF THE PRESENT INVENTION

It is desired to overcome at least some of the limitations described above in relation to the existing known methods for generating and manipulating an industrial design representation.

According to one aspect of the present invention, there is provided a method and system for enabling the designer of a representation of an industrial design to apply constraints to that design which limit a further co-designer from complete freedom in altering the design. In other words, the present invention encompasses a method for two or more people to modify a design representation of an object where one person has more control than the other. In this way, there can be two types of users, namely professional 'original designers' and amateur 'co-designers'. The original designer is also the creator of the original model and can set limits within which the 'co-designers' can design. Parts of the design can thus be 'opened up' by the original designer for the co-designer to manipulate. Other 'unopened' parts of the design are 'locked' and cannot be changed by the co-designer. The co-designer is free to manipulate and/or modify those portions of the original design which have been designated as 'open' within the limits set by the original designer.

More specifically, according to one aspect of the present invention there is provided a collaborative method of generating a design representation of an object between a first user and a second user, the method comprising: designating, at a first user terminal, a set of design object variables relating to different aspects of the design representation; specifying, at the first user terminal, constraints for the set of design object variables, the constraints comprising a range of first user designated values for each of the designated object variables of the set; receiving at a second user terminal, the set of design object variables, the constraints for the set and the design representation via a communication network; enabling, at the second user terminal, manipulation of the design object representation, the enabling step comprising enabling selection of a particular value of at least one of the designated object variables only within the constrained value range specified by the first user; and presenting on the second user terminal a graphical representation of the design object representation as specified by the second user selection.

The advantages of this method have been described above.

The method may further comprise selecting a plurality of points of the design representation and grouping the selected points as a functional region of the design representation. In one embodiment this grouping is carried out by a process of tagging selected vertices of a polygonal mesh representation. This grouping is highly advantageous as different regions of the design can be specified and a set of variables for manipulation specified for this group. There are significant computation costs savings in taking this approach as the number of data points which have to be processed is reduced as compared to the whole design.

The selecting and grouping steps may comprise selecting and grouping a set of non-adjacent points of the design object representation into the functional region. This has the advantage of enabling spaced apart points of a design to be controlled with a common set of constraints. Alternatively, the selecting and grouping steps comprise selecting and grouping a set of adjacent points of the design object representation into the functional region.

The selecting and grouping steps may be repeated to create a plurality of functional regions of the design representation and the method may further comprise locking one of the functional regions to prevent any manipulation of this part of the design by the second user. This ability to define and lock certain parts of the design enable the first user to have a high degree of control over the manipulations which will be allowed by the second co-designer.

The method may further comprise applying a fall-off weighting function to the selected functional region, the fall-off weighting function graduating the effects of any second user manipulation of the selected functional region to other regions of the design representation. This fall-off weighting function functions to enable a smooth transition between regions which are fixed in their structure and other regions where the second user may make significant changes.

The method may further comprise applying a dynamic skin function to the design representation, wherein the dynamic skin function enables another geometry to be imported and attached to each vertex within a group, to create a textured skin effect of the design representation.

The method may further comprise applying an assembly function to the design representation, wherein the assembly function enables a pre-defined geometry to be attached to a selected point of the design representation.

The method may further comprise applying a group poly function to the design representation, wherein the group poly function enables a the user defined constraints to be applied to the specified region of the design representation.

The constraint specifying step, at a first user terminal, may comprise locking at least one of the set of design object variables, to prevent any variation by the manipulation enabling step at the second user terminal.

The design object representation may be a three-dimensional model of an object, represented by a polygon mesh, and the method may further comprise importing, at the first user terminal, a design representation of the object; and wherein the designation step comprises designating the set of design object variables by selecting one or more polygon vertices comprised within the polygon mesh; and the specifying step may comprise specifying a range of coordinate values for each of the one or more selected polygon vertices.

The method may further comprise compiling the results of the constraints specifying and the design object variable designating steps into a constraints file and transmitting the same to the second user terminal. This is a convenient way in which the constraints can be conveyed to the second user terminal.

The method may further comprise compiling the results of the manipulation enabling step at the second user terminal into a finalised design file and transmitting the same to a centralised data storage facility. Furthermore, the method may further comprising receiving the finalised design file at the central location and storing the same in a central data store.

The method may further comprising sending the finalised design file to a three-dimensional printer, the three-dimensional printer being arranged to manufacture a three-dimensional object in accordance with the finalised design file. In this way, personalised designs for the second user can be manufactured rapidly and inexpensively into products.

The method may further comprise displaying on the first user terminal, a graphical representation of the design object representation in a graphical user interface, wherein the graphical user interface provides tools for carrying out the constraints specifying and the design object variable designating steps. In this way the first user can advantageously manipulate the constraints and see the effects of this on the design before committing to the actual specific values.

The presenting step may comprise using a graphical user interface on the second user terminal to present the graphical representation of the design object representation, and the method further comprise providing tools in the graphical user interface for carrying out the manipulation enabling step.

The tools of the graphical user interface may comprise a set of slider icons, where each slider relating to one design object variable and amount of allowable movement of the slider representing the range of variation possible for the associated design object variable. This is a simple, logical and intuitive way of changing the values of the design variables.

Each slider icon preferably has variable limits which are adjustable by the first user to constrict the range of variation of the associated design object variable.

Also the method may further comprising providing a local check box for at least one of the slider icons, the check box providing a way for the first user to lock the value of the design object variable to a particular amount.

The method may further comprise providing a global check box for the design, the global check box providing a way for the first user to apply a global function to at least one aspect of the design, such as surface orientation.

The method may further comprise: automatically determining a global set of design variable modification constraints required to maintain the functionality of the design using a physics module, and applying these global modification constraints to the set of design object variables to prevent modifications being made which prevent the design from performing its desired function.

The step of determining the global set of design variable modification constraints may comprise using a physics engine, the physics engine being able to simulate the behaviour of an object with a specified geometry and to determine whether the specified geometry will be stable within the environment.

The method may further comprise analysing the set of design object variables and the constraints for the set for a given design representation as determined by the first user or the particular selected values of the designated object variables of a given design representation as specified by the second user to determine any logical inconsistencies which may prevent automated machine creation of an object to the design.

According to another aspect of the present invention there is provided a system for collaboratively generating a design representation of an object between a first user and a second user, the system comprising: a designating module, provided at a first user terminal, for enabling determination of a set of design object variables relating to different aspects of the design representation; a specifying module, provided at the first user terminal, for enabling a first user to specify constraints for the set of design object variables, the constraints comprising a range of first user designated values for each of the designated object variables of the set; a receiver, provided at a second user terminal, the receiver being arranged to receive the set of design object variables, the constraints for the set and the design representation via a communication network; a manipulation module, provided at the second user terminal, the manipulation module being arranged to enable manipulation of the design object representation by enabling selection of a particular value of at least one of the designated object variables only within the constrained value range specified by the first user; and a graphical user interface (GUI) provided at the second user terminal, the GUI being arranged to present a graphical representation of the design object representation as specified by the second user selection.

The system may further comprise a central server in communication with the first and second user terminals, wherein the first terminal is arranged to download the designating and specifying modules from the central server and the second terminal is arranged to upload the selection of a particular value of at least one of the designated object variables to the central server as a finalised second user design.

According to another aspect of the present invention there is provided A collaborative design system allowing two different users to collaboratively manipulate a design object representation, the system comprising: a first user terminal, arranged in use for operation by a first user; a second user terminal, arranged in use for operation by a second user; a communications network arranged to allow the transmission of design object data between the first and second user terminals; wherein the first user terminal is arranged to allow the first user to designate a set of design object variables relating to the design object representation, and to specify a range of first user designated values for each of the designated object variables of the set; and the second user terminal is arranged to receive the first user designated set of design object variables via the communication network, and is further arranged to allow the second user to manipulate the design object representation, by selecting a particular value of at least one of the designated object variables only within the designated value range specified by the first user.

The design object representation may be a three-dimensional model of an object, represented by a polygon mesh, and the first user terminal may be arranged to designate the set of design object variables by selecting one or more polygon vertices comprised within the polygon mesh; and specify the range of first user designated values by specifying a range of coordinate values for each of the one or more selected polygon vertices.

The system may further comprise combining means arranged to combine the second user selected value of the at least one designated object variable with the design object representation to generate a second design object representation; wherein the second design object representation represents a three-dimensional polygon mesh of a design object comprising the second user's selected object variable values.

The system may further comprise a three-dimensional printer, and wherein the system is arranged to forward the second design object representation to the three-dimensional printer, the three-dimensional printer being arranged to manufacture a three-dimensional object in accordance with second design object representation. In this regard the system may further comprise conversion means for converting the second user manipulated design object representation to a set of instructions executable by the three-dimensional printer.

The system may comprise a shared data store located remotely to both the first and second user terminals, arranged to communicate with both the first and second user terminals via the communication network; wherein the second user terminal is arranged to access the design object representation, the set of design object variables, and the specified range of designated values, which are stored in the shared data store, via the communication network.

The shared data store may be arranged to receive the second user selected value of the at least one designated object variable from the second user terminal and to store the same in the shared data store.

The system may further comprise generating means for generating the second user design object representation on the basis of the received designated object variable value and the stored object design representation. Also the system may further comprise converting means for converting the second user design object representation into executable printing instructions for the three-dimensional printer. Preferably the three-dimensional printer is arranged to manufacture the object in accordance with a laser sintering process.

The design object may be a computer-aided design (CAD) generating using CAD means local to the first user terminal.

According to another aspect of the present invention there is provided a method for allowing two different users of a collaborative design system to collaboratively manipulate a design object representation, the method comprising: designating at a first user terminal a set of design object variables relating to the design object representation; specifying at a first user terminal a range of first user designated values for each of the designated object variables of the set; receiving at a second user terminal, the first user designated set of design object variables and the design object representation via a communication network; manipulating at the second user terminal the design object representation, the manipulation step comprising selecting a particular value of at least one of the designated object variables only within the designated value range specified by the first user; and presenting on the second user terminal a graphical representation of the design object representation as specified by the second user.

According to another aspect of the present invention there is provided a graphical user interface (GUI) for use in modifying an object design representation, the GUI comprising a viewing window for viewing the object design representation, a control panel for enabling user variation of a plurality of different variables associated with the design representation, wherein each different variable has an associated user operable graphical device the manipulation of which enables the displayed design representation to change in real time showing the effect of the change in value of the design variable on the design representation.

Preferably, each of the graphical devices have user adjustable features to set the range of variation of the design variable. The GUI may be arranged to enable the user to lock the value of the selected design variable. The GUI may be arranged to enable the user to select points of the design representation which are to form a subgroup of the whole design on which user manipulations can be carried out using the control panel. The GUI may be arranged to enable selection of a plurality of subgroups and for the user to lock at least some of the subgroups from any further variation. The control panel may comprise slider controls with the ability to fix the extremes of the slidable range. Alternatively the control panel may comprise a radar graphical device where the selected angle of variation determines the variation of the design variable. The ability to lock certain parts of a design advantageously enables the original designer to retain the functionality of the object, and to retain the aesthetics of the object. Thus, features essential for the object to be able to perform its function can highly-advantageously be prevented from being changed by the co-designer. Equally, the original designer may also control the degree to which the aesthetic appearance of the object may be modified, to preserve any distinctive design features.

Thus customer's demands for greater freedom of choice, not only in the colour or material of products, but also in the form of the products they purchase can advantageously be accommodated (by them acting as co-designers). Designers and brands can maintain control of their designs by locking certain features of the design or restricting the amount of variation of other parts but at the same time allow co-designers to tailor non-essential aspects of the designs to suit their personal tastes.

This kind of collaboration requires a different set of tools to that which are currently available and known within the industry, and the present invention, in one aspect, provides these new tools functionally.

Another aspect of the present invention relates to the graphical user interface controls, for example sliders, which when adjusted apply the changes to the specific elements of the design.

The present invention according to another aspect provides a mechanism of manipulating three-dimensional graphical images in an efficient manner requiring far less computation overhead than has previously been available. This is achieved by the process of tagging regions of interest (namely groups of specified vertices which can either be adjacent or non-adjacent), and thereafter applying transforms to the tagged groups only rather than the entire object itself.

Once the 3D object representation has been finalised, it can be sent to an industrial printing process which can create (print) real 3D objects according to the specifications of the CAD representation. This printing process is a laser sintering process which involves sequentially manufacturing layer upon layer of the object of the representation, and fusing the layers together using high powered lasers until the actual object is created. This can then be sent to the co-designer for use. The key advantage of this approach is to have the ability to create low-volume unique objects without the high costs previously associated with prototyping.

The possible modifications by the original designer are numerous and may include any modification to the appearance of the object such as twisting, bending, stretching or modifying the surfaces of objects. Once happy with the design, the original designer posts the product design to a remote server accessible to the co-designer. The co-designer may then access and modify the design object via an internet browser application, by navigating to the rapid manufacturing website, such as UCODO.com, hosted by the server. The co-designer is free to modify the design within the degree of creative freedom designated by the original designer.

The co-designer (customer) is then able to:
1. View these products online within a 3D environment;
2. Make modifications to the product in real time, which may include form, surface finish and colour;
3. Decide upon a large selection of post processing techniques; and finally
4. Order one or more of each objects made to the unique design online for delivery.

The present invention's approach of co-design profoundly challenges the traditional role of the designer and the user/consumer of a product. The system and method of the present invention offers the users the option of co-creating and co-designing products with a professional product designer. By this, a user can "tweak" existing designs to their personal taste within the constraints set by the original designer. Facing a product produced by this industrial process, the user is now confronted with questions never before asked: do I purchase the product as designed, or do I change it? And the Designer must now ask himself the question: when is this not my design anymore?

The present invention allows mass customisation to be realised. By this, the general public can co-create and co-design products with professional product designers through an online library or sales house. In a 3D environment, products can be modified in real time—stretched, twisted, embossed, assembled—all with the simple movement of a mouse. On top, users can adjust form, choose colour and material, save designs in an online library, and purchase when ready for delivery, which may be of the order of within two weeks. The co-designer will never be able to ruin the functionality of a product such as a pen. Similarly, the co-designer will never be able to ruin the balance or stability of a teapot, since the designated constraints will at least partly be selected to maintain functional and structural integrity.

Embodiments of the present invention are now described with reference to the accompanying drawings.

BRIEF DESCRIPTION OF THE DRAWINGS

FIG. 3a is a listing showing an example of an ODO file of FIG. 1 showing its major components;

FIG. 3b is a schematic block diagram showing the major components of a rapid manufacturing server shown in FIG. 1;

DETAILED DESCRIPTION OF THE EMBODIMENTS

The present embodiment is made possible by the existence of rapid manufacturing and laser sintering technologies. There are essentially two stages to the process, the first being creation of a 3D design of the desired object and the second is the use of the design in manufacturing the object and providing that to the customer. The first stage involves creation by an original designer of a constrained design from a raw design data and thereafter the creation of a finalised design by a co-designer. This second stage is a printing process of the finalised design using layer-based manufacturing, using types of plastics, metals or composite metals in powder form. All manufacturing systems of this type comprise a combination of a computer CAD system with a laser sintering machine (or 3D printer) to perform the fabrication of a layer under computer control.

Figure 1:
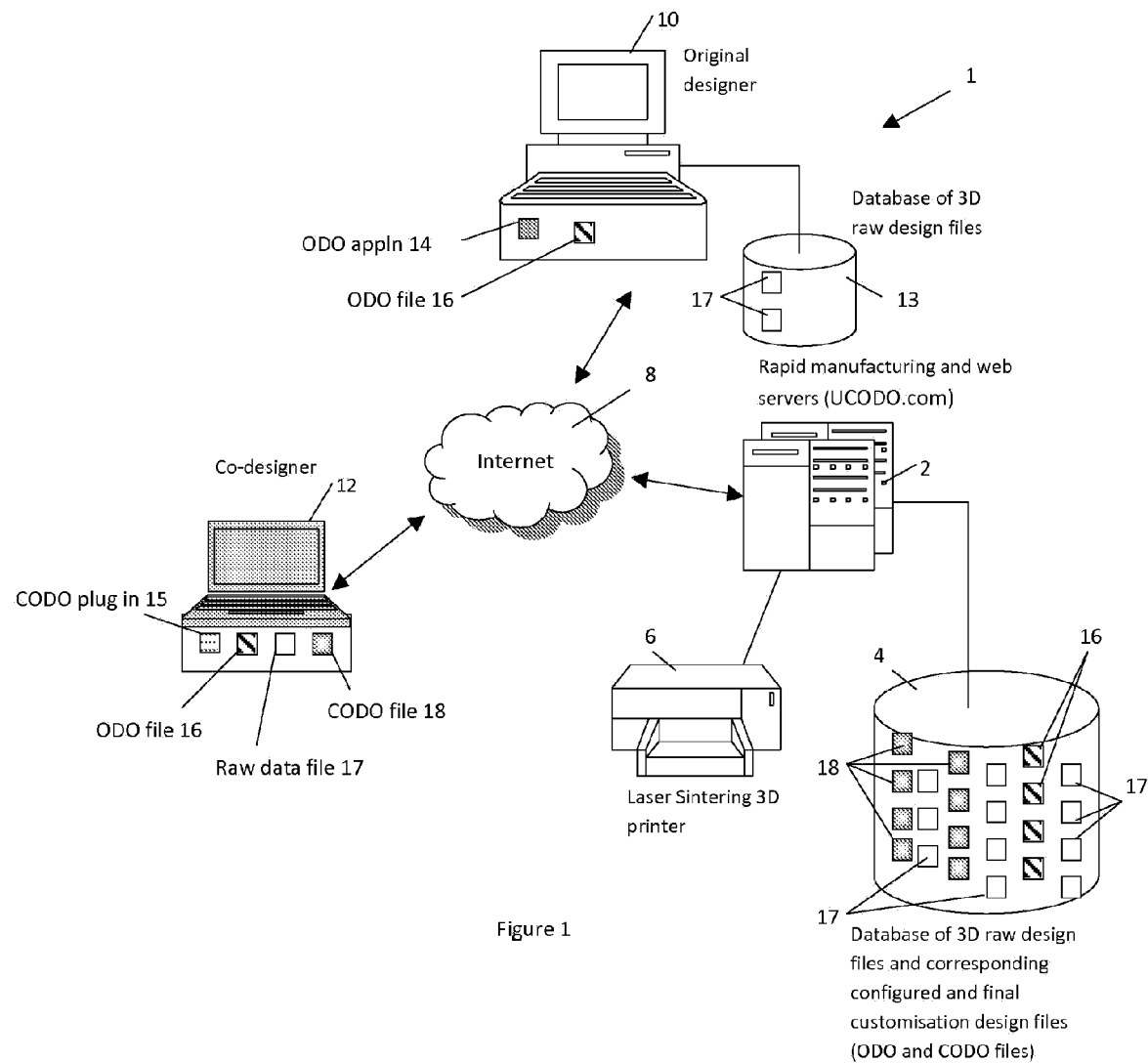
FIG. 1 is a schematic block diagram showing a rapid manufacturing system according to an embodiment of the present invention.

An embodiment of the present invention is implemented as a rapid manufacturing system providing a web-based service. Referring to FIG. 1, the rapid manufacturing system 1 comprises a rapid manufacturing server 2 (or platform) which controls the operation of the service. The rapid manufacturing server 2 is coupled to a database 4 for storing a library of 3D object design files and their respective constraint files and a laser sintering 3D printer 6. Furthermore, to make the service available to users via the internet 8, a web server is also provided in the manufacturing server 2.

In preferred embodiments, both the original designer and the co-designer interact with the present system from two different user terminals, located remotely to the rapid manufacturing server 2. The user terminals may relate to conventional computers, with local processing capabilities. Alternatively, the terminals can be any computing device with the capability to view and edit these files. For example the co-designer terminal could be a mobile device such as a mobile phone, tablet computer or a personal digital assistant (PDA) with an Internet browser capability. In the ensuing description of the preferred embodiments, the terminals will be referred to as computers.

Also shown in FIG. 1, is an original designer computer 10 connected to the rapid manufacturing server 2 and a co-designer computer 12 also connected via the internet 8, or other communication means to the rapid manufacturing server 2. The original designer computer 12 has a data store 13 of original raw CAD data files which have been created using a conventional CAD application such as AutoCAD®, or Autodesk 3ds Max® (formerly 3D StudioMax®) to name but a few of the current commercially available conventional CAD products.

Each of the users of the system 1 interacts with it in different ways by use of a local program running on the user's terminal. In this embodiment, the original designer computer 10 also has downloaded onto it an Original Design Object (ODO) application program 14 for creating a set of constraints on the original CAD design, and the co-designer computer has a Co-Designer Object (CODO) browser plug-in 15 provided to enable the web browser (not shown) of the co-designer computer 12 to read any 3D CAD file and allow manipulation and/or modification of the CAD file within constraints which have been set by the original designer from his terminal. The constraints are stored in an ODO data file 16 and sent together with the original CAD raw data file 17 to the rapid manufacturing server 2 for storage in the constrained designs library within the database 4. Thus in use, the original designer will via his terminal/computer 10 need to obtain an application 14 allowing ODO files 16 to be generated. For example, such an application, which for present purposes may be referred to as an ODO application program 14, may be downloaded from the rapid manufacturing server 2 onto the original designer's computer 10. The ODO application program 14 takes as its inputs the raw data CAD file 17 which retains the original CAD design, and allows the original designer to constrain the CAD object. This process is described in further detail later.

Similarly, the co-designer computer 12 needs to be equipped with means for reading and accessing the original designer generated ODO file 16, in addition to reading raw data 3D CAD files. This may be achieved by downloading an application capable of both reading ODO files 16 and raw data 3D CAD files 17 onto the co-designer's computer 12. In a preferred embodiment, a plug-in is downloaded which provides additional functionality to the co-designer's existing web browser, allowing both the ODO files 16 and raw data 3D CAD files 17 to be read using the web browser. Once the plug-in 15 is installed, the browser on the co-designer's computer 12 is then able to open up any raw data 3D CAD file of the correct format, and allows the co-designer to manipulate it using his computer 12 within the constraints set by the original designer on their computer 10. Both the constraints file (ODO data file) which has been created by the original designer, and the raw data CAD file are downloaded to the co-designer's computer 12, and are used by the co-designer to define, or select a final set of constraints to be applied in a finalised object design personal to the co-designer. The co-designer's selection is restricted within the set of overall constraints set by the original designer, namely it further limits the degree of variability of the design. Effectively, in defining the constraints, the original designer is defining the degree of object design freedom available to the co-designer and the co-designer finalises the design working within these constraints. This process is also described in detail later.

As mentioned previously, alternative embodiments of the present invention may comprise the use of cloud computing, wherein the required computational services are provided exclusively by the remotely located rapid manufacturing server 2, or alternatively by any number of remotely located servers. In such an embodiment, the user terminals 10 and 12 are effectively dumb terminals, with minimal processing capability, that interact with the shared resources provided by the cloud (group of remote computing resources—not shown), and all processing and code execution is carried out by the cloud. Equally, all processing and code execution tasks may be executed by the rapid manufacturing server 2. In such embodiments, both the original designer terminal 10 and the co-designer terminal 12 are provided with browsers and plug ins. In such embodiments, the rapid manufacturing server 2 will need to provide the functionality of the ODO application program, or alternatively the cloud will need to provide this functionality. In these alternative embodiments, GUIs are generated for each user which may be generated in conventional web browser windows.

Figure 2A:
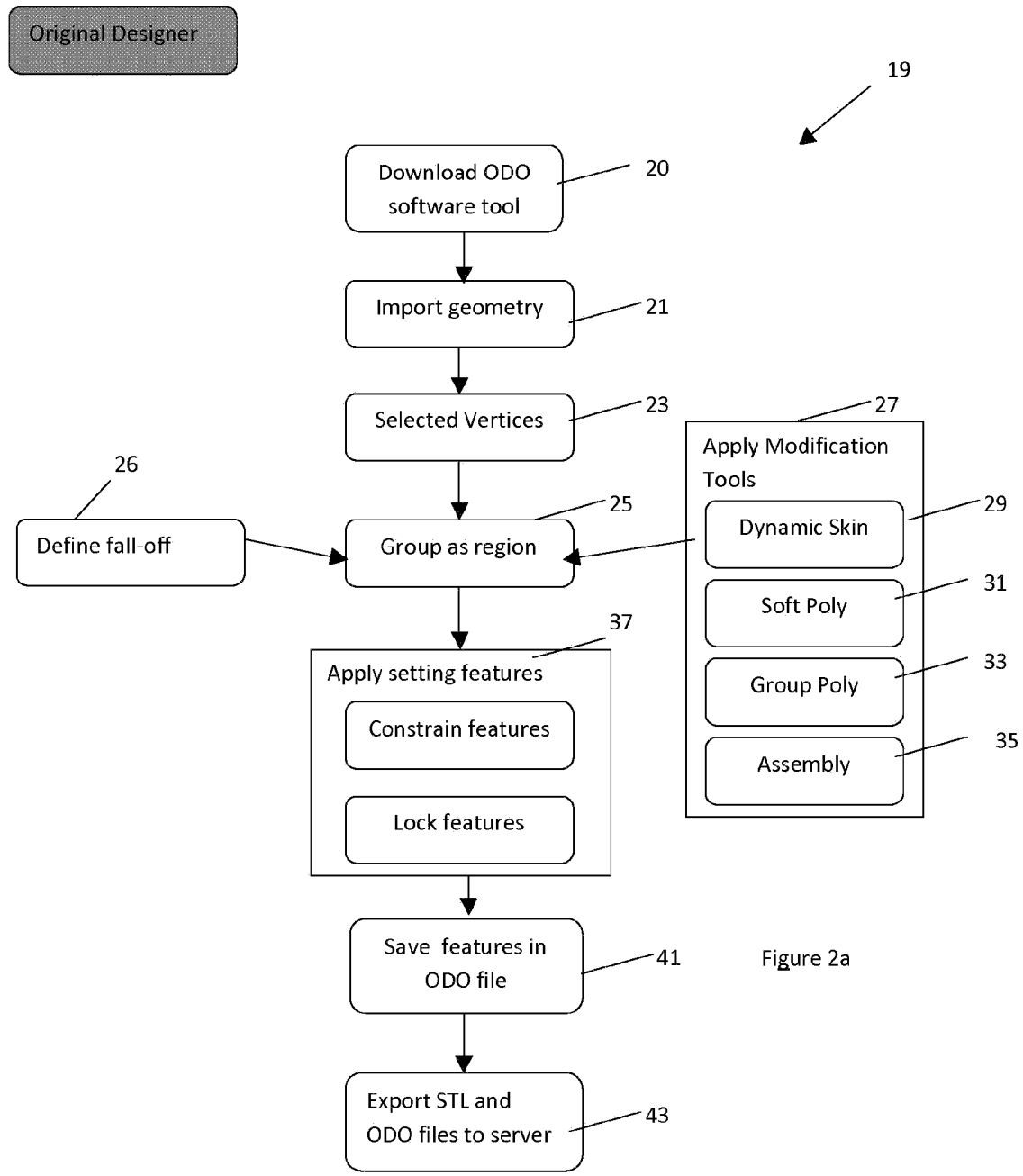
FIG. 2a is a flow diagram showing an original designer's interaction with the system of FIG. 1 in setting up an ODO design file for a co-designer.
Figure 2B:
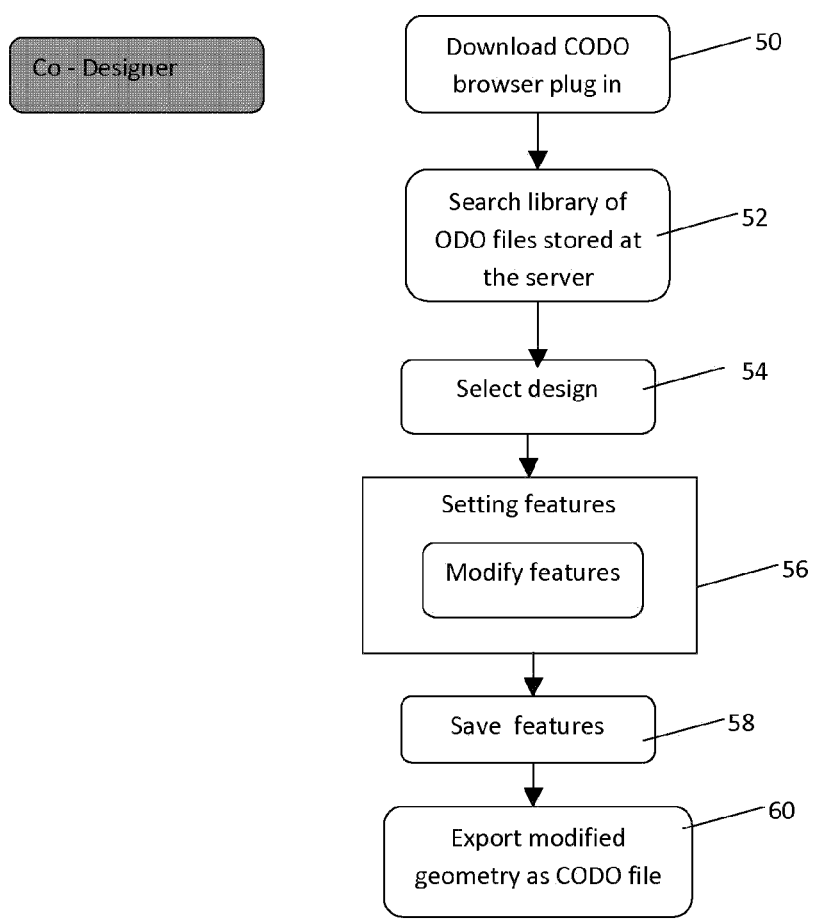
FIG. 2b is a flow diagram showing a co-designer's interaction with the system of FIG. 1 in finalising a design file CODO file which has been set up an original designer.

The operation of the system 1 is now described with reference to FIGS. 2a and 2b. The operation of the system is different according to the type of user accessing the system, and in the following description will be described in terms of the original designer's interaction with the system 1 and subsequently in terms of the co-designer's interaction with the system 1. FIG. 2a shows the system interaction with an original designer and FIG. 2b shows the system interaction with a co-designer who may be a customer. FIGS. 2a and 2b are described with respect to an embodiment where both the original designer terminal 10 and the co-designer terminal 12 are enabled with local processing capabilities as provided by conventional personal computers.

Referring firstly to FIG. 2a, the process 19 commences with the original designer downloading an ODO application program 14 in step 20, that allows the original designer to set constraints on a design object, which has been previously created in a CAD application. The ODO application program 14 may support both offline and online modes of operation. In the offline mode of operation, the original designer designates the required design object constraints using the original designer terminal 10, and stores this designation in the ODO application file 16, which is uploaded to the rapid manufacturing server 2 at a later time. In the online mode of operation, the original designer designates the design object constraints using the original designer terminal 10, whilst in direct communication with the rapid manufacturing server 2. The designated constraints are uploaded to the rapid manufacturing server 2 as they are selected. For the purposes of this description, these designed constraints in the on-line mode of operation are considered to be equivalent to the ODO file 16.

The original designer may create the raw 3D design in any desired CAD package. As mentioned previously, examples of commercially available CAD applications are AutoCAD®, or Autodesk 3ds Max®. The original designer then exports the geometry from the CAD application as an STL file (though other file formats are also possible) and this is saved as a raw data CAD file 17 in a local data store 4, as illustrated in FIG. 1. The skilled reader will appreciate that STL files describe only the surface geometry of a three dimensional object without any representation of colour, texture or other common CAD model attributes.

The original designer then imports at step 21 the raw 3D model design embodied in the STL file into the ODO application program 14. FIGS. 4 through 8 are examples of the GUI representations of the ODO application program 14, in accordance with preferred embodiments. The aforementioned figures are discussed in further detail later.

The original designer is provided with tools within the ODO application program 14 enabling the selection of any vertices of interest within the raw 3D object model. The skilled reader will appreciate that the raw 3D model is effectively a 3D polygon mesh model of the desired object. Each polygon comprises several vertices, dependent on the type of polygon used. For example, conventionally a mesh of triangular shaped polygons are used, in which case each triangle is associated with three different vertices which may be manipulated and/or modified. In step 23 the original designer selects the desired vertices. The selected vertices are grouped together in step 25 by a process of tagging (which is described in detail later). Once a group has been defined, in step 27 other modification tools provided by the GUI which enable the original designer to set the constraints of the grouped vertices are used. The tagging function, defines the topological region of the 3D object which the co-designer may manipulate and/or modify. The original designer now defines the type of manipulation and/or modification the co-designer is entitled to, in addition to quantifying the amount by which the designated manipulation and/or modification may be applied by the co-designer.

3D object vertices are now defined as either within or outside of the selected group. Any modification that is done to the 3D object at this stage will only affect the vertices in the selected group. There is, however, an additional method of defining a topological region of the 3D object by defining a 'Fall-off' using a fall-off tool. Here, instead of vertices being affected by modifications only if they fall within a designated group, vertices can be affected in exact proportion to the weighting that is applied to them by defining a fall-off. The fall-off defines the amount or proportion by which vertices neighbouring a designated vertex being manipulated, are to be manipulated and/or modified in response to the manipulation and/or modification to the designated vertex. The objective of defining a fall-off is to help maintain the aesthetic appeal of a design object. There are also advantages for the co-designer in having a defined fall-off. For example, the co-designer may manipulate a selected vertex and the neighbouring vertices are automatically manipulated proportionally to the manipulation of the selected vertex—the co-designer does not need to individually manipulate the neighbouring vertices. The fall-off is defined in step 26.

For example, the fall-off may relate to a three-dimensional distribution (Gaussian for example) placed in 3D object space, and the amount by which a modification affects vertices in that area can be determined by the value of that distribution at that coordinate in object space.

Figure 9:
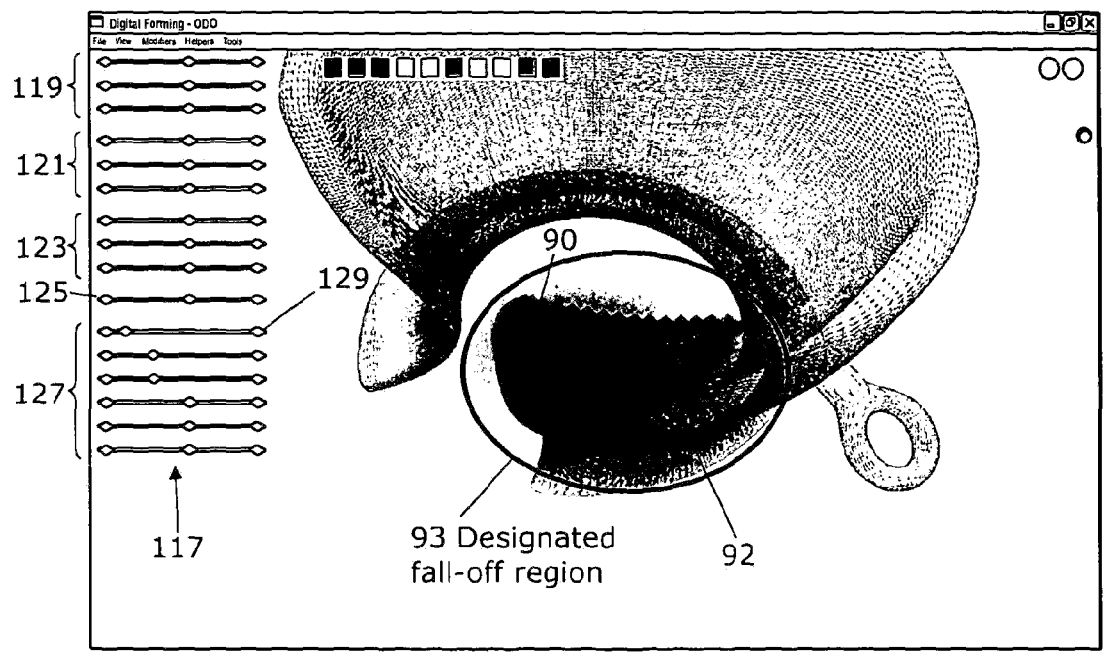
FIG. 9 is a screen shot of the GUI of FIG. 7 showing a set of sliders for setting constraints and how the selected regions soft boundary has been reduced in the Z direction by manipulation of the $6^{th}$ from bottom slider.

FIG. 9 is a good example of the fall-off. The circled region 93 relates to a region where a fall-off has been defined. The intensity of the distribution on the vertices is depicted by a progressively fading shading. In the illustrated example, the highlighted vertices 90 have been selected for modification, and furthermore a fall-off has been applied to the neighbouring vertices 92, which will also be modified by an amount determined by the applied fall-off if the co-designer decides to manipulate and/or modify the highlighted vertices 90. For example, FIGS. 10*a* and 10*b* both illustrate examples of how the co-designer could manipulate and/or modify the highlighted vertices 90. The proportion, or equally the amount by which the neighbouring regions are manipulated in response to the manipulation of the highlighted region 90 is defined by the applied fall-off.

Use of the fall-off tool is optional, and once a region has been completely defined, with or without a fall off, a modification tool can be applied to it in step 27. The modification tool has several different aspects to it, and examples of some different types of modification tool which may be applied are summarised briefly below.

The Dynamic Skin tool 29 allows another 3D geometry to be imported and attached or connected to each vertex within the selected group. This creates a textured skin effect to the object. The imported surface geometry can be orientated at any required angle and scaled to the appropriate size.

The Assembly tool 35 allows the original designer to selected individual vertices and assign multiple options of assembled geometries that can be connected to that region. For example, a coffee cup geometry may have multiple handles that a co-designer may have access to and can connect to a particular vertex.

In the Group Poly tool 33, a region, with fall off, is modified. The modifications are to the geometry of the region itself. This can include the location of the vertices (x,y,z), their rotation relative to each other (x,y,z) and how far apart they are from each other, which is commonly known as scaling.

The Soft Poly tool 31 is very similar to the Group Poly tool 33 except here only a few vertices are selected, normally at different areas of the 3D object. The manipulation of them is otherwise identical to the Group Poly tool 33.

The original designer can also select from a menu within the GUI window, all of the colours and post-processing techniques (glossy, matt, dyed) that he/she will allow the 3D object to be manufactured in. This creates a sub-selection that will be made available to the co-designer when making the final selection. (This is described in detail later).

As has been previously described, the original designer creates a region by selecting groups of vertices that define the surface of the object. Each region can be manipulated in a number of ways and by a defined amount by the co-designer. The job of the original designer, therefore, is to select from the list of modification tools (dynamic skin 29, soft poly 31, group poly 33 and assembly 35) and define the exact limitations and freedoms for a selected region of the design that will be granted to the co-designer to design within. Once this process has been completed for one region, another region can be selected and different constraints applied to that region to produce a different variability for that part of the design. There is no restriction to the number of regions that the original designer may define. Accordingly, steps 23 and 25 may be defined for as many different regions as the original designer wishes. As will be shown later, the original designer has the option of visualising the effects of applying the allowed modifications to the raw 3D within the ODO application program 14. In preferred embodiments, the modifications are displayed in real time within the GUI, allowing the original designer to see the effect of applying the current constraints to the current design. In step 37, the original designer defines the applicable constraints to the designated vertex regions.

Once the original designer has completed defining the constraints, he saves a constraints file which is called an .odo file 16 (shown in FIG. 1) in step 41. The .odo file 16 completely defines all of the constraints selected by the original designer. This file also includes the colours and post-processing techniques that have been made available to the co-designer by the original designer.

The original designer's process is completed once the geometry of the object design (STL file) and the constraints (ODO file 16) file are uploaded in step 43 to the rapid manufacturing server 2. The ODO file 16 (i.e. the constraints file) together with the original raw data CAD file (STL file) completely define the parameters of how the design object can be modified by the co-designer. The original designer has now created an 'open design product' that can be manipulated by the co-designer into a final personal design object for the co-designer.

Referring now to FIG. 2b, the co-designer's interaction with the rapid manufacturing server 2 is now described with respect to a preferred embodiment where the co-designer terminal is a conventional computer, having local processing capabilities. The process is initiated in step 50 by the co-designer downloading a plug-in (CODO plug-in 16 illustrated in FIG. 1) that allows the co-designer terminal to view and manipulate and/or modify the original designer designated open portions of the design object within the browser application program. This plug-in is very similar to a plug-in for Adobe Flash®, and Microsoft Silverlight® etc. in that once installed, the browser will use it every time it comes across the correct file format.

In step 52, the co-designer searches an object design, which may relate to a product, from the on-line library of configured designs created by one or more different original designers, which are stored in the central database 4, and accessible via the rapid manufacturing server 2. In step 52 the co-designer selects a desired design object. Upon selection, both the STL file and the corresponding ODO file 16 (the constraints file) associated with the selected object design are streamed to the co-designers computer 12 and are stored temporarily in RAM. The storing of both the STL file and the associated ODO file 16 in RAM is an optional feature, and may be preferable in embodiments where the original designer wants to protect the design from unauthorised reproduction and/or use. The co-designer is presented with the geometry of the design object within the browser window (GUI), along with the available colours, post-processing techniques, and a list of the allowed constrained manipulations and/or modifications that may be applied to the design object. Note that the co-designer never sees the unavailable colours of post-processing techniques and is unaware of how much the original designer has constrained his object. The co-designer is merely provided with a number of manipulation tools with which the design object may be manipulated within the original designer selected constraints, which are defined within the ODO file 16.

In step 56, the co-designer uses the manipulation tools, made available by the original designer's selected constraints, which are presented as icons within the GUI to change different object variables of the design. FIGS. 11 through 17 illustrate examples of the co-designer GUI, in accordance with an embodiment of the present invention. In the illustrated embodiments the manipulation tools are presented as simple sliders (see FIGS. 11 to 17b) with each slider relating to a different one of the object design variables which can be varied. The effects of varying the variables in this simple, easy-to-use manner are viewable by the co-designer in real-time, as manipulations and/or modifications of the displayed geometrical representation of the 3D design object. This real-time viewing feature is only possible because the manipulations and/or modifications are being applied to previously defined (i.e. by the original designer) subsets (i.e. tagged vertices) of the entire design object representation.

Once the co-designer has selected the desired colour and post-processing techniques and manipulated and/or modified the topology of the design object within the constraints as defined by the ODO file 16, the co-designer selections are saved in step 58. At this point a CODO file 18 (final customisation file) is generated with all of the co-designer selected modifications. This file is uploaded in step 60 to the rapid manufacturing server 2, and given a temporary, time stamped name. The header of the CODO file 18 is read and the bounding box volume of the co-designed object is determined. This may be used as a variable within a look-up table (not shown) to determine and display the final price of the product subsequently manufactured to the manipulated and/or modified design object, to the co-designer.

Upon receipt of payment (made may be made via conventional web-service payment channels such as Paypal), the CODO file 18 is sent to the rapid manufacturing server 2. The CODO file is stored along with an 18 digit number that the server 2 has created that uniquely identifies the co-designer's purchase. The reader will appreciate that the CODO file 18 completely describes the co-designer selected manipulations and/or modifications, which include colour, and texture in addition to any topological modifications selected by the co-designer, from within the available, original designer designated constraints. This 18 digit number may be converted into a 3D tag (similar to clothes tags) and is attached to the physical geometry of the object manufactured in accordance with the newly co-designed 3D object model. In other words, the 18 digit number is incorporated into the physical object manufactured in accordance with the co-designer manipulated and/or modified 3D CAD design object. The 18 digit number serves as a way to identify the physical product when it emerges from the 3D printer. The rapid manufacturing server 2 takes the CODO file 18 and associates it with the original STL file (i.e. the raw data 3D object module, also commonly referred to as the 3D CAD file), and creates a new modified STL file which incorporates the co-designer selected manipulations and/or modification and the 3D tag into one coherent file STL file. This file can then be sent to the 3D printer and the object/product can be printed and shipped to the co-designer.

In different embodiment, the 3D printer is not attached to the rapid manufacturing server but rather is provided by a third party as part of a web-based print service (printing bureau). In such an embodiment, the modified STL file with the 3D tag attached is placed into a directory where the 3D printing bureau can see it. Then the bureau, through its web portal, can download this new geometry and send it for 3D printing. The bureau will also have the shipping address of the co-designer which it can print off and attach to the parcel for pick up from the courier service.

Having described the processes of an original designer creating a constrained design object file from an uploaded raw data 3D design object file; the co-designer selecting and manipulating and/or modifying open parts of the 3D object design to create a final design object file; and the general printing of a physical object to the co-designer selected design, further details regarding the manufacturing of the 3D design object to the final design are described below.

The skilled addressee will appreciate that the co-designer selected final design file (i.e. CODO file 18) and the original STL file, when taken together are effectively a 3D CAD representation (final customised design) of the co-designer manipulated and/or modified object. As mentioned previously, the STL file and the CODO file 18 are merged to generate an updated STL file, which may be executed by the 3D printer. In a preferred embodiment, where the 3D printed employs a laser sintering process, the final STL file needs to be adapted for use in the 3D laser sintering printer. This adaptation involves slicing the modified and/or manipulated 3D CAD representation into cross-sectional layers of a certain thickness, typically 0.1 to 0.25 mm. The two-dimensional (2D) cross-sectional profiles are stored in a triangulated (tessellated) format in the STL file. The rapid manufacturing server 2 may then converts this adapted STL data into machine data, which is executable by the 3D printer 6. Alternatively, the adaptation process may directly be carried out by the 3D printer itself prior to printing. The 2D cross-sectional layers are required such that the laser sintering 3D printer 6 is able to sequentially print each layer of the design object using the specific fabrication process.

The process is repeated for each layer of the sliced 3D object representation, such that the printing of the design object occurs layer by layer. Lasers within the sintering machine fuse new, neighbouring layers of the powdered material together, by heating and melting, gradually 'growing' the solid object (or group of objects) over a number of hours. Once removed, the object is blasted to eliminate excess surface particles, cleaned and post processed to the customers' specifications.

A non-restrictive list of examples of objects which can be the subject of the design process of the present invention are homeware, jewellery, electronics, giftware and personal ware.

Subsequently, the finished object can be sent to the co-designer (customer) using conventional means, such as by post.

FIG. 3a provides an example of an ODO file 16, and serves to illustrate the type of information, which may be comprised within a constraints file. Here it can be seen that: the volume, colour and surface features are listed in a WEBHEADER section 70; the 3D CAD raw data file 72 (STL file to which the constraints apply) is identified in the HEADER section; each of the groups of vertices (Vertexlist 0, Vertexlist 1, Vertexlist 2) are specified in the VERTEX GROUPS section 74; and each of the modifier constraints as defined by the tool which is to be applied is specified under the MODIFIER CONSTRAINTS section 76. In this latter section, it can be seen that two different tools have been applied to three vertex groups, namely DYNAMIC SKIN to Group 0, and SOFT POLY to Groups 1 and 2. The specific values given to each parameter within each tool are also provided. The MODIFIER CONSTRAINTS define the types of modifications and/or manipulations the original designer has designated, and consequently defines the types of manipulations and/or modifications the co-designer may select. For example, the co-designer may apply one or more of DYNAMIC SKIN 29, and SOFT POLY tools 31 to defined groups of vertices of the raw 3D object model. Furthermore, the original designer has set extremum values for each of the applicable modifications and/or manipulations. The extremum values define quantitative amounts by which each designated tool may be applied by the co-designer to the raw 3D design object. In other words, the co-designer is free to apply one or more of the designated tools by an amount within the original designer designated extremeum values.

FIG. 3b is a schematic diagram of the rapid manufacturing server 2 in accordance with an embodiment of the present invention. The rapid manufacturing server 2 is comprised of several modules, which provide the required functionality. There are at least two primary functions of the server: 1) to provide the functionality for creating the constrained data files (i.e. the ODO files 16) though interaction with the original designer; and 2) to provide the functionality for creating the final customisation design file (i.e. the CODO file 18) through interaction with the co-designer. This functionality is provided by the original designer/co-designer interaction control module 80.

The Print Control Module 82 provides an interface for communicating with the 3D printer 6, and controls the generation of the updated STL file. As mentioned previously, this requires expressing the modified topology of the 3D object data file as several 2D cross-sectional layers, which the 3D printer 6 subsequently uses to construct the corresponding physical object, using the aforementioned layering process. The Database Interaction File Management Module 84 controls the storage of the raw 3D CAD data files 17, the ODO files 16 and the CODO files 18 within the 3D design object database 4. This module also provides the library function, which the co-designer requires in order to select a 3D object design for modification and/or manipulation.

Four further optional modules are shown, namely the Vertices Selection and Tagging tool 86, the Modification tools 88, a Fall-off Setting tool 90 and an Original Designer/Co-designer Feature Setting module 92. These modules provide the functionality of the ODO application program 14 and the CODO plug-in 15, which have been described earlier. Specifically, these optional modules are provided for embodiments of the present invention where the ODO application program 14 is not stored locally in the original designer's terminal 10, and where all interaction with the rapid manufacturing server 2, by both the original designers and co-designers, is via browsers with the aforementioned plug-ins 15. In such embodiments, the functionality of the ODO application 14 is provided by the rapid manufacturing server 2.

The skilled reader will appreciate that in alternative embodiments, where the original designer terminal 10 is provided with locally stored and accessible ODO application processing module, the aforementioned optional modules—namely, Vertices Selection and Tagging tool 86, Modification Tools 88, Fall-off setting tool 90, and Original designer/Co-designer feature setting module 92—are not necessarily provided at the rapid manufacturing server 2.

Figure 4:
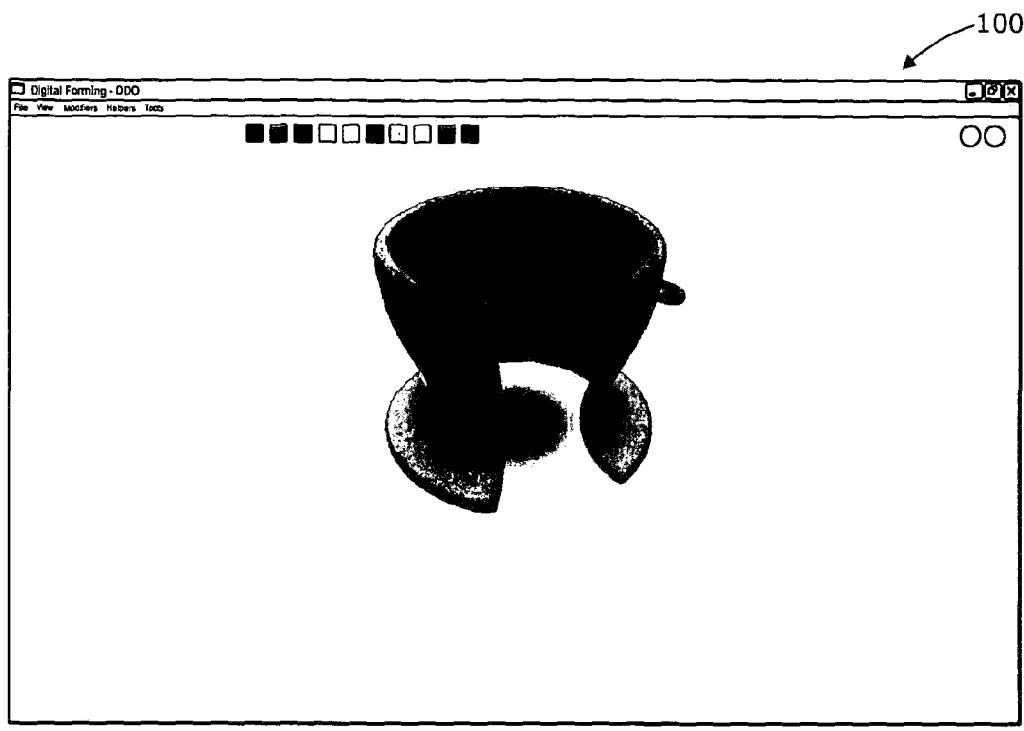
FIG. 4 is a screen shot of a GUI generated by the rapid manufacturing system of FIG. 1, showing the design representation of an egg holder (egg cup)

To enable the co-designer to modify and/or manipulate the raw 3D design object in accordance with the original designer constraints as designated in the ODO file 16, the CODO plug-in 15 provides a subset of the functionality afforded by the modification tools 88 and feature setting module 92.
Tagging FIG. 4 illustrates an example of the ODO application GUI 100 in accordance with the present embodiment. It is to be appreciated that the ODO application 14 provides the original designer with the required functionality to designate the required 3D object design manipulations and/or modifications, which the co-designer may subsequently apply via the CODO plug-in 15. For example, the illustrated GUI 100 comprises a drop-down file menu tab titled "Modifiers" 101, which provides the aforementioned Modifier Tools. The designer imports a 3D geometry 102 (raw design file 17), into the ODO application 14. As mentioned previously, the ODO application 14 may either be executed locally on the original designer's terminal 10, or alternatively may be executed remotely on the rapid manufacturing server 2, wherein the original designer interacts with the remotely executed application using for example, a web browser equipped with the appropriate ODO plug-in (not shown). For the purposes of the present description, the first of the two aforementioned embodiments is described below.

Using the ODO application GUI 100, the original designer can import a 3D design object geometry 102, designate and save, defined object manipulation and/or modification constraints. The imported 3D design object can be viewed as a wireframe, with the vertices highlighted, or simply as a solid object. The "View" menu tab 103 allows the original designer to select the desired 3D design object view type.

The original designer has access to all the currently available modifier tools, such as Soft Poly 31, Group Poly 33, Dynamic Skin 29 and Assembly 35 tools from the Modifier tab 101. The aforementioned modifier tools are for illustrative purposes only, and are not limiting to the present invention. The skilled reader will appreciate that any 3D object design modifier tool may be incorporated into the ODO application 14, and such alternatives are envisaged and fall within the scope of the present invention.

Before designating a design constraint, the original designer can visualise the 3D object design manipulation and/or modification that is being given to the co-designer. For example, the original designer may conduct a manual visual verification of all the different combinations of designated manipulation and/or modification the co-designer may make within the defined constraints. Alternatively, more sophisticated embodiments may additionally comprise a simulation tool module (not shown) within the ODO application 14, which automatically visually shows the original designer all the possible combinations of 3D object design manipulation and/or modification the co-designer may select within the designated constraints. Equally, the simulation module may simulate and visually depict within the ODO application GUI 100 only a selection of allowable 3D object design manipulations and/or modifications, and visually depict within the ODO application GUI 100. For example, the simulation module may illustrate a random selection of manipulations and/or modifications of the 3D object design within the defined constraints. This simulation module can be very helpful to the original designer in realising the affects on the design of setting ranges of allowable manipulation for the co-designer.

Once the original designer has decided which 3D object manipulations and/or modifications to allow a co-designer, the 3D object geometry is tagged. The tagging defines how the co-designer can manipulate and/or modify the 3D design object.

Tagging involves selecting the vertices on the 3D polygon surface mesh that defines the 3D design object. The selected vertices are then grouped and named. In preferred embodiments, the selecting of the vertices may be achieved by the designer simply holding the left mouse button, and dragging over the desired vertices. The vertices selected in this way may then be colour highlighted within the GUI. The selected vertices may then be named for subsequent ease of reference. For example, the selected vertices may be numbered by holding down the control key and selecting any digit from 0-9. Alternative naming methods are envisaged, and the exact method used is immaterial to the present invention, provided that different selected groupings of vertices may be discerned.

Figure 5:
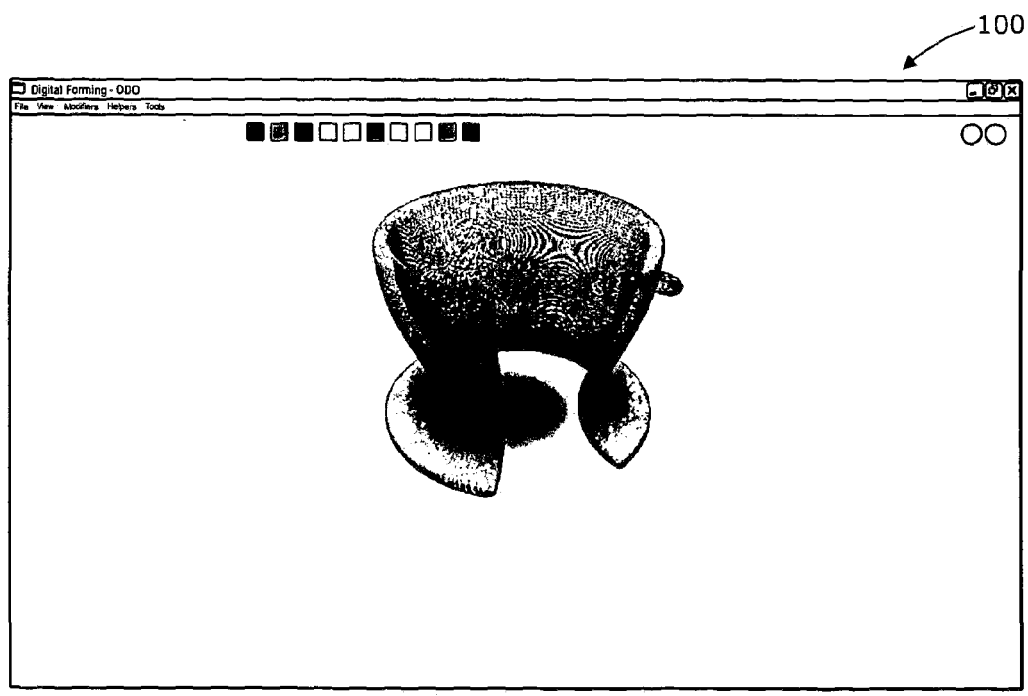
FIG. 5 is a screen shot of the GUI of FIG. 4 showing the design representation as a mesh of vertices.

FIG. 5 shows an alternative way in which the 3D design object of FIG. 4 may be viewed within the ODO application GUI 100. The 3D design object is represented as a 3D polygon surface mesh 106 of the 3D object of FIG. 4. The 3D polygon mesh defines the 3D object's surface. When selecting/tagging and grouping vertices, the 3D polygon mesh view may be preferable, since the vertices are readily discernable in this visual representation of the 3D design object.

Figure 6:
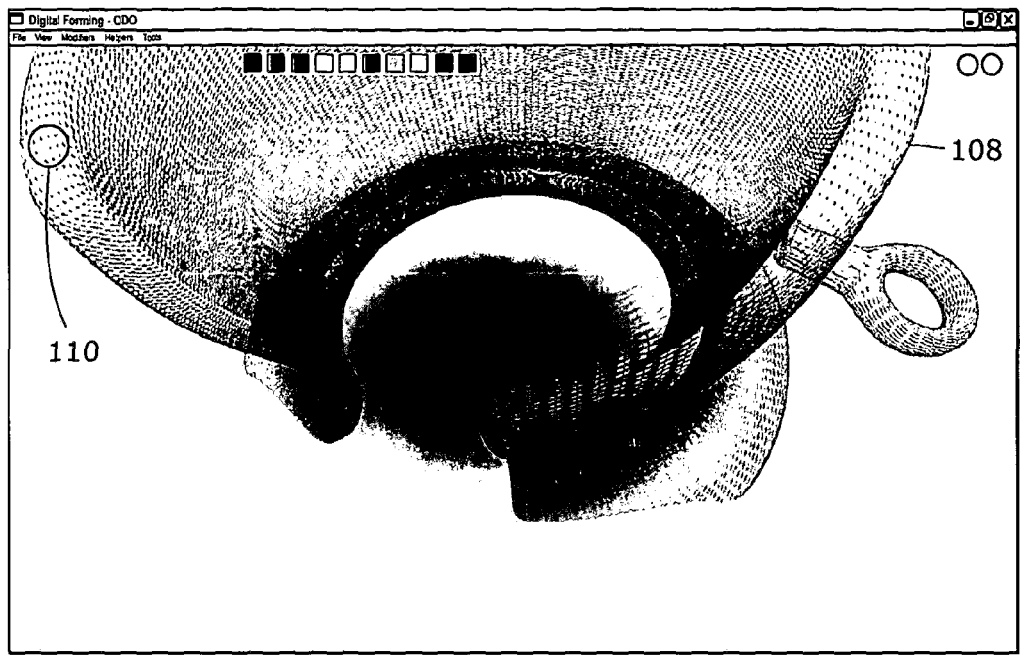
FIG. 6 is a screen shot of the GUI of FIG. 5 showing the mesh of vertices in greater detail.

FIG. 6 is an enlarged view of the 3D polygon surface mesh 108 of the 3D design object of FIG. 5. This surface mesh is made up of triangles (or polygons) which have corners called vertices. The circled region 110 shows an example of the aforementioned polygons and vertices. It is these vertices that can be selected and tagged in the aforementioned manner.

Figure 7:
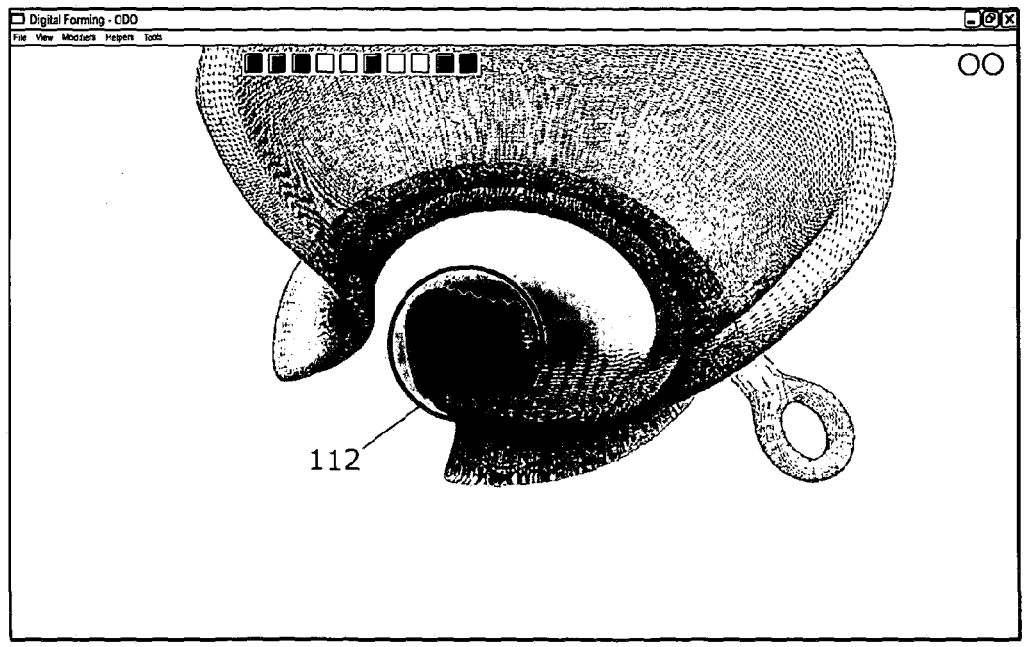
FIG. 7 is a screen shot of the GUI of FIG. 6 showing a group of vertices which have been selected by a designer using the GUI.

FIG. 7 shows a group of vertices 112 that have been selected by the original designer, which are shaded for current illustrative purposes. These vertices are grouped together and become known as a region. The grouping of each region defines the verticies to which the subsequent tagging will be applied.

Each region can have a tool assigned to it that defines how the co-designer can interact with that region of the object.

In preferred embodiment, the structure of the ODO data file that is generated by the tagging of a group of vertices and that has a modifier tool applied to them, is as follows:

---

HEADER
{
SourceModel NAME
}
VERTEXGROUPS
{
VertexList 0 - Vertex ids
}
MODIFIERCONSTRAINTS
{
MODIFIER NAME
Group NAME
MODIFICATION DETAILS
}

---

FIG. 3a illustrates a practical example of the ODO data file and has been previously described above.

Figure 8:
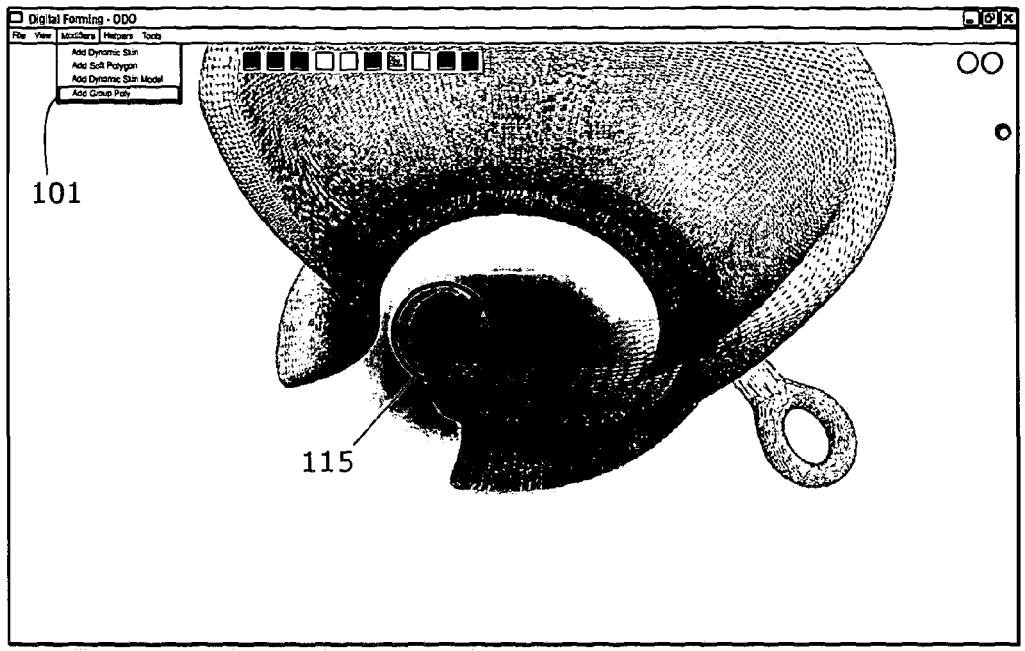
FIG. 8 is a screen shot of the GUI of FIG. 7 showing a Group Poly Tool being assigned to the region selected in FIG. 7.

FIG. 8 illustrates an example of the 'group poly' tool being assigned to the shaded region 115. The group poly tool 33 is selected from the Modifier tab menu 101.

Once the group poly tool 33 has been selected from the Modifier menu 101 and applied to a selected region 115, modification tools 117 in the form of several sliders appear which allow manipulation of the group poly tool 33. The sliders 117a are shown on the left hand side of the GUI of FIG. 9. Each slider 117a corresponds to a different variable associated with the selected modifier tool—in the presently illustrated embodiment, the group poly tool 33. Variation of the sliders 117a allows the user to manipulate and/or modify how the group poly tool 33 is applied to the selected region of the 3D design object. In other words, variation of the sliders 117a allows the user to modify and control how the selected modifier tool 117 is applied to the selected region or vertices of the 3D design object. Each slider 117a is associated with a different type of manipulation of the group poly tool 33, and accordingly will modify the selected region in a different way. Similarly, each different selectable modifier 117 tool brings up a similar set of sliders 117a when selected.

Each different slider allows the selected modifier tool to be manipulated and/or modified in a different way. For example, referring to FIG. 9, where the group poly modifier is selected, selection of any of the top three 'moving' sliders 119, allows the location of the vertices of the selected region to be displaced along any of the x-, y-, and/or z-axis. Selection of any of the subsequent three 'scaling' sliders 121, allows modification and/or manipulation of the scale of the coordinates of the vertices within the selected region along any of the x-, y- and/or z-axis. Selection of any of the subsequent three 'rotation' sliders 123 allows rotation of the vertices within the selected region along any of the x-, y-, and/or z-axis. Selection of the following slider 125 inflates the selected region of the 3D design object. Selection of any of the bottom six sliders 127 allows the extended area of the 3D design object to be defined, which will be affected by the selected modification tool. The progressively fading shaded region 92 illustrates this. The shading fades moving away from the selected area 90. The advantage of sliders 127 is that the selected modification tool can be applied to the selected region area 90, and the neighbouring vertices are modified in accordance with a weighting, such that the effect of the applied modifier tool progressively decreases in further located vertices. This helps to maintain the aesthetics of the design object and ensures that the user (i.e. the original designer and/or the co-designer) does not need to select and define every vertice which will be modifier and/or manipulated due to application of the modifier tool. For example, selection of the sixth slider from the bottom 129 affects how the selected region's soft boundary is modifiable in the direction of the z-axis.

Figure 10A:
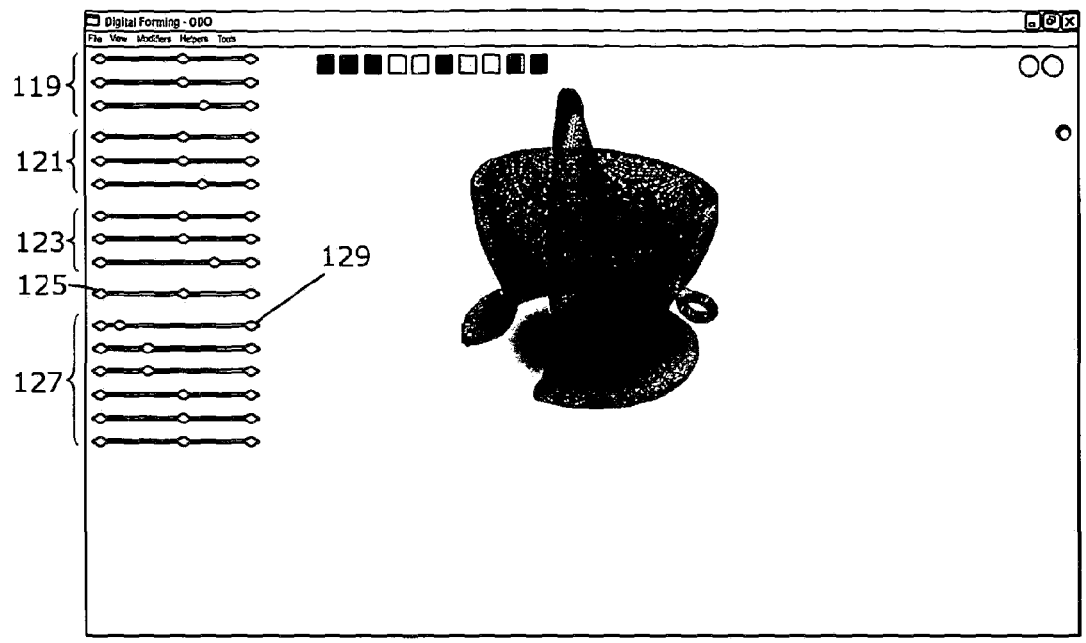
FIGS. 10a and 10b are screen shots of the GUI of FIG. 9 showing two different ways in which the same defined region of the object are affected by manipulation of the slider controls.
Figure 10B:
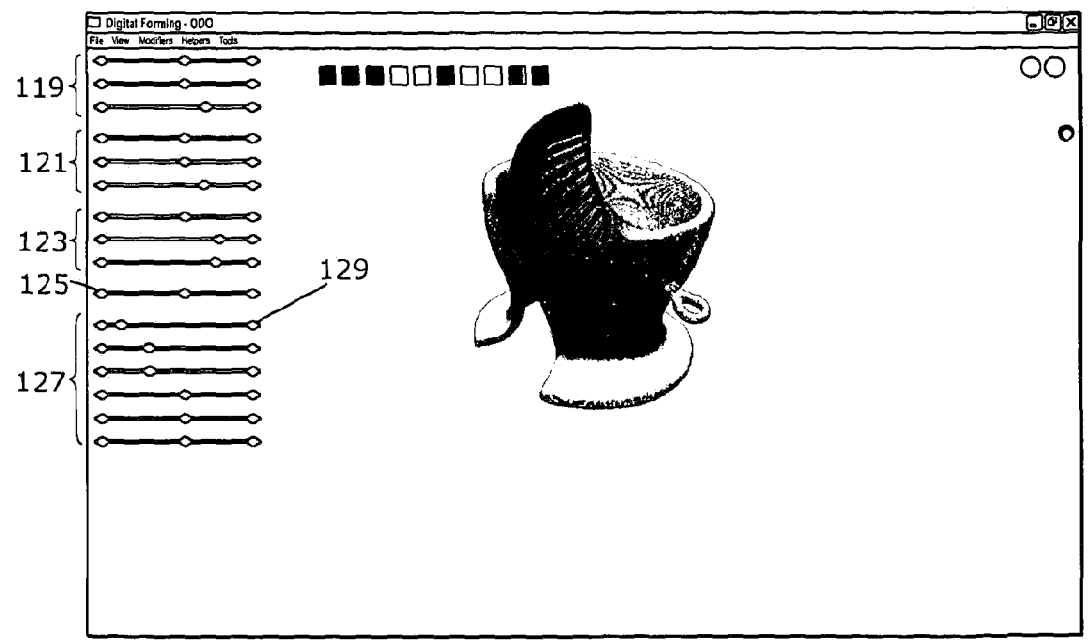

FIGS. 10*a* and 10*b* both show examples of how the same selected region of the 3D design object illustrated in FIG. 9, can be manipulated and/or modified in different ways by selection of one or more of the 'moving' sliders 119, the 'scaling' sliders 121, and the 'rotation' sliders 123. The modifications associated with each slider are applied to the selected vertices, and to any neighbouring vertices in accordance with the weighting, modifiable using sliders 127. In both cases, the degree to which the modification affects individual vertices is in proportion to the strength of the modifier at that point (as depicted by the shading).

Setting Constraints

As mentioned previously, to create the ODO file 16 (constrained design file) the original designer needs to define the design constraints associated with the 3D design object. In other words, the original designer needs to define the constraints within which a co-designer may manipulate and/or modify the 3D design object.

Once the original designer has established which types of manipulation and/or modification to allow the co-designer to use, the original designer defines the applicable design constraints. To clarify, once the original designer has selected which modifier tools are available to the co-designer, the design constraints for each modifier tool are defined. The setting of constraints may comprise selecting the amount by which each slider associated with each designated modifier tool may be varied. In a preferred embodiment, each slider, instead of having one button that can move from left to right, has three.

Figure 11:
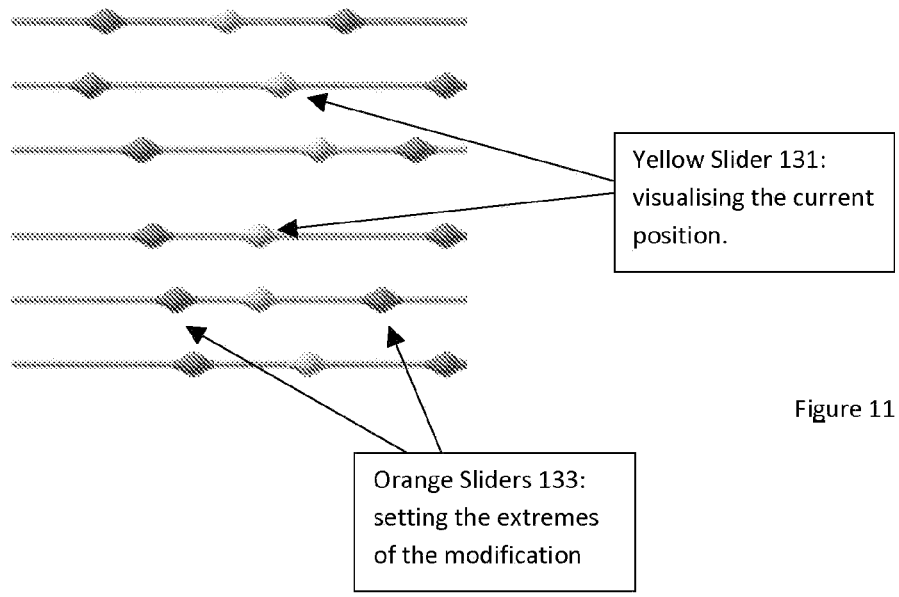
FIG. 11 is a zoomed-in screen shot of the GUI of FIG. 9 showing the slider controls in greater detail.

FIG. 11 illustrates an example of this preferred embodiment. The yellow button sliders 131 define the position of the modification currently being visualised. Moving this button slider 131 from left to right visually modifies the geometry of the object in real time.

The orange button sliders 133 on the left and right of the yellow button slider 131, set the limits within which the co-designer can modify his object. They represent the design constraints.

Figure 12:
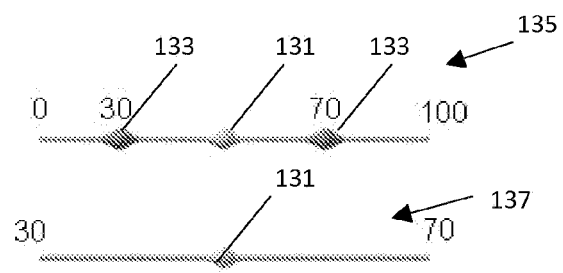
FIG. 12 is a zoomed-in screen shot of the GUI of FIG. 9 showing how the constraints are set by the original designer using the slider controls.

FIG. 12 shows the yellow and orange button sliders 131, 133. An example of how constraints set by the original designer can affect the co-designer can be seen by looking at a first slider 135 the yellow button slider 131 of which has been restricted to move only within the values of 30 and 70. The defined constraints restrict the value that a selected modifier tool can have.

In preferred embodiments, the numerical values of the constraints are not shown to the co-designer, and the co-designer does not necessarily realise that he has been restricted between the values of 30 and 70 as the slider scale is normalised and the orange button sliders have been removed all together 137.

Figure 13A:
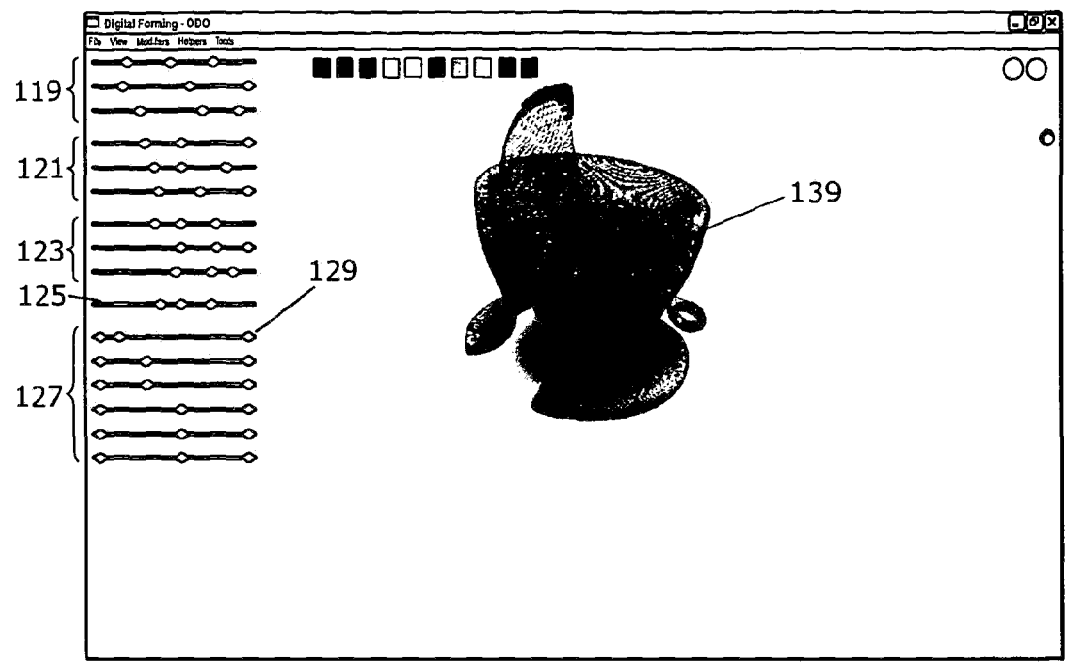
FIGS. 13a, 13b and 13c are screen shots of the GUI of FIG. 9 showing three different ways in which the same defined region of the object are affected by manipulation of the slider controls by the co-designer working within the constraints set by the original designer.
Figure 13B:
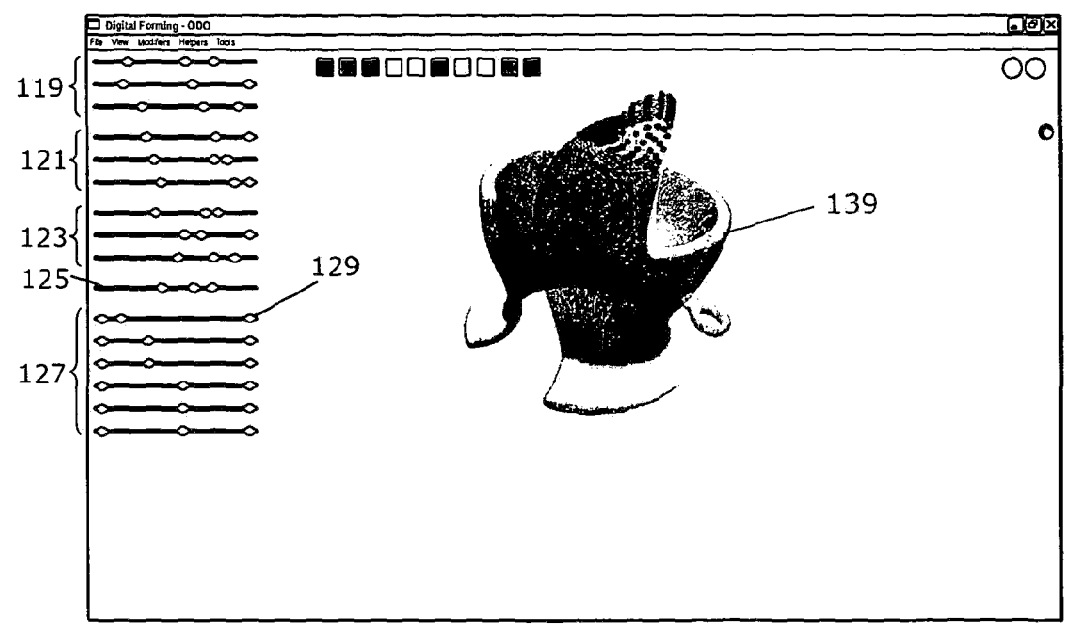
Figure 13C:
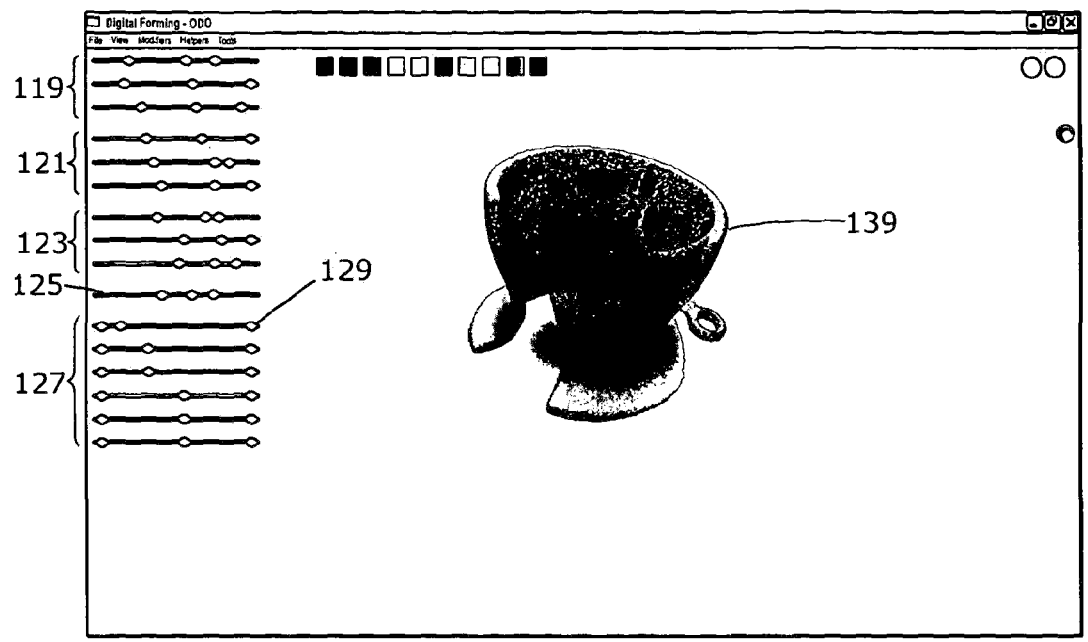

FIGS. 13*a*, 13*b* and 13*c* respectively show different modifications of an original design 139 made by a co-designer within the constraints that have been set by the original designer. It can be seen that even though modification of the object (an egg cup) has been contrained, there is still substantial room for creative freedom by the co-designer.

Locking Modifications

Check boxes may be used in alternative embodiments as a method of highlighting information. They can be used to change the way that a tool is used or can be used to lock certain interactions. The following example describes an embodiment of the present invention, which is similar to the previously described embodiment, the differences being described below.

Figure 14A:
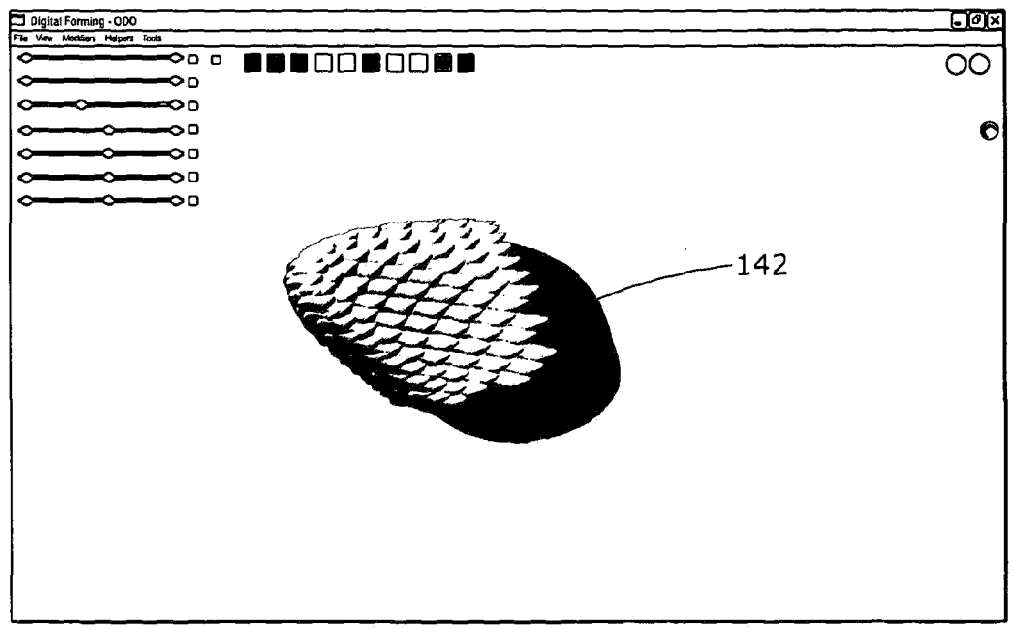
FIGS. 14a and 14b are a screen shots of a GUI according to an embodiment of the present invention which shows a surface reorientation function for selected surface features of an object before and after application.
Figure 14B:
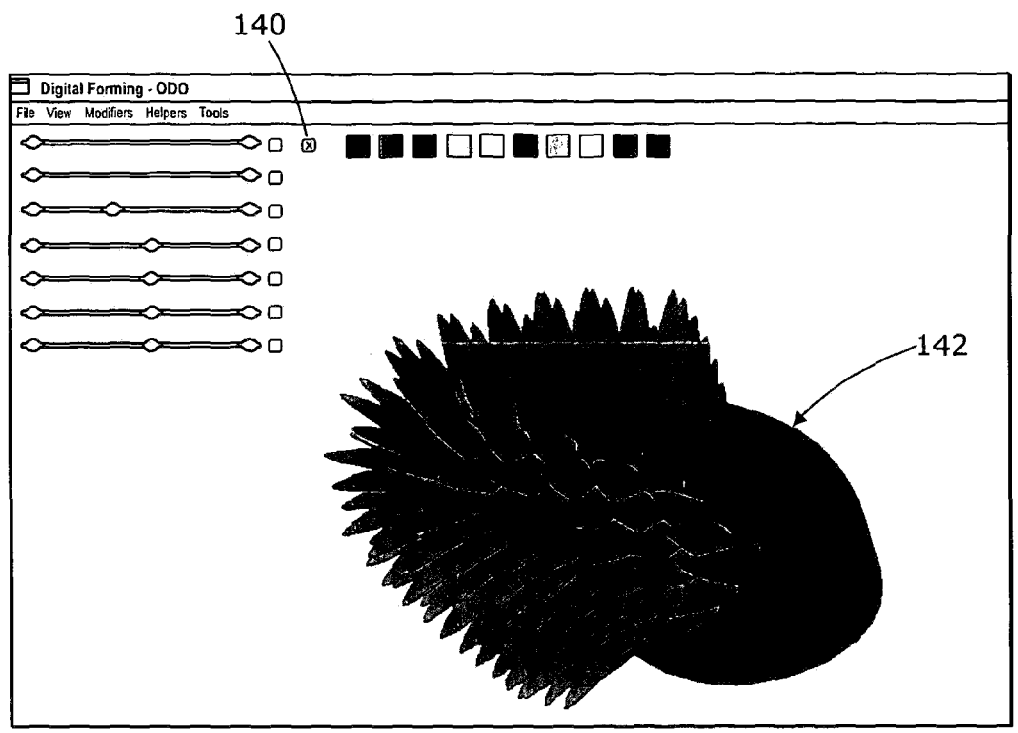

In this embodiment, the example shown is one of how a check box 140 can be used to re-orientate surface features from lying in one direction to instead lying perpendicular to the surface that they are sitting on. FIG. 14*a* shows the interaction before the check box 140 is selected and FIG. 14*b* shows how the check box 140 can be used to re-orientate these selected surface features of a object representation 142. There is a specific surface re-orientation function provided which allows this to occur. Generally, the surface reorientation function reads the orientation of the vertex and assigns the same orientation to the object that is attached to it.

The dimensions of the surface features can still be modified in the same way, and the range of modification can still be constrained in the normal way by using the constraint sliders. The only difference is that here the orientation has been determined by the original designer and the co-designer then modifies with that assigned orientation.

Another way in which check boxes 140 are used in this embodiment is in completely locking a modification and thus preventing any interaction by the co-designer with the specific variable associated with the selected modifier tool. The original designer instead of defining constraints, picks a specific value for that slider and locks it in place. The co-designer now has no ability to modify that feature in any way.

Figure 15:
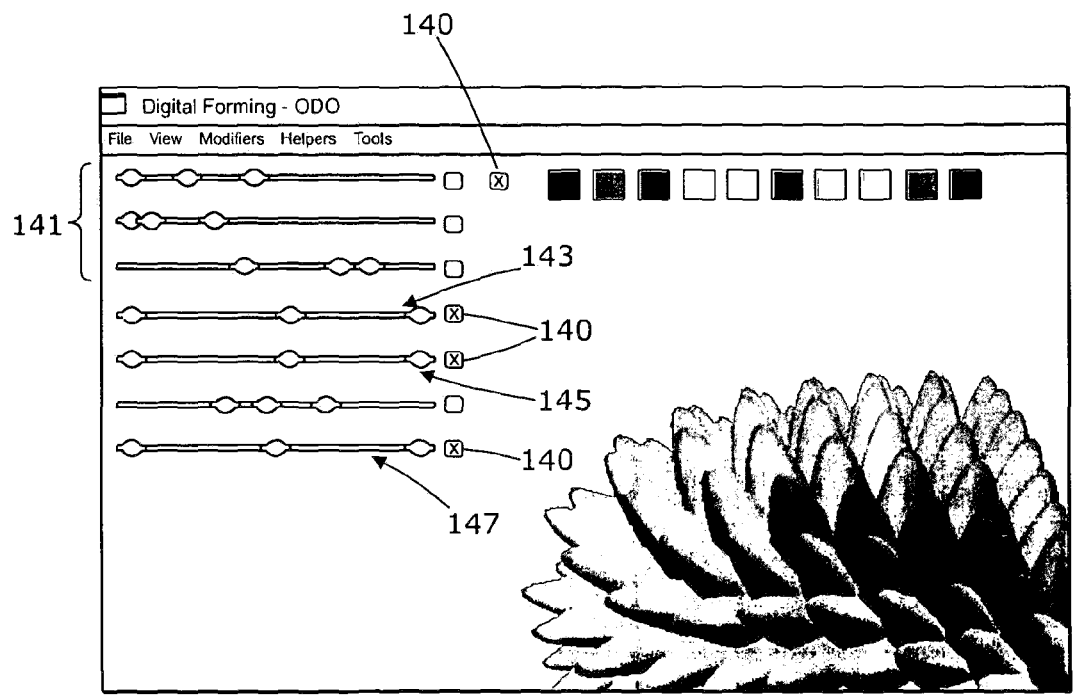
FIG. 15 is a zoomed-in view of the GUI of FIG. 14a, showing how different slider controls can have fixed constraints applied and others have variable constraints applied.

An example of how check boxes can be used is described below with reference to FIG. 15. As can be seen from this figure, the first three sliders 141 have had constraints defined, but sliders 143, 145 and 147 have instead had their respective check boxes 140 checked.

Reasons for Constraining

There are three reasons for setting constraints in the freedom of the co-designer to modify a product.

1. The original designer will want the customised product to remain aesthetically appealing and in line with his original vision of the product. Moving too far away geometrically from that will likely result in a shape that is no longer appealing.
2. The object needs to remain functional. If modification was left unconstrained then there is a good chance that the geometry of the object could have a detrimental effect on the function and performance of the object.
3. The file that a 3D printer reads needs to be very specific and it is therefore very sensitive to changes by an inexperienced co-designer. Problems that are likely to occur by bad modifications to the geometry include inverted polygons, bad edges and holes. These errors if unchecked will cause errors during the printing process and result in damaged products.

Figure 16:
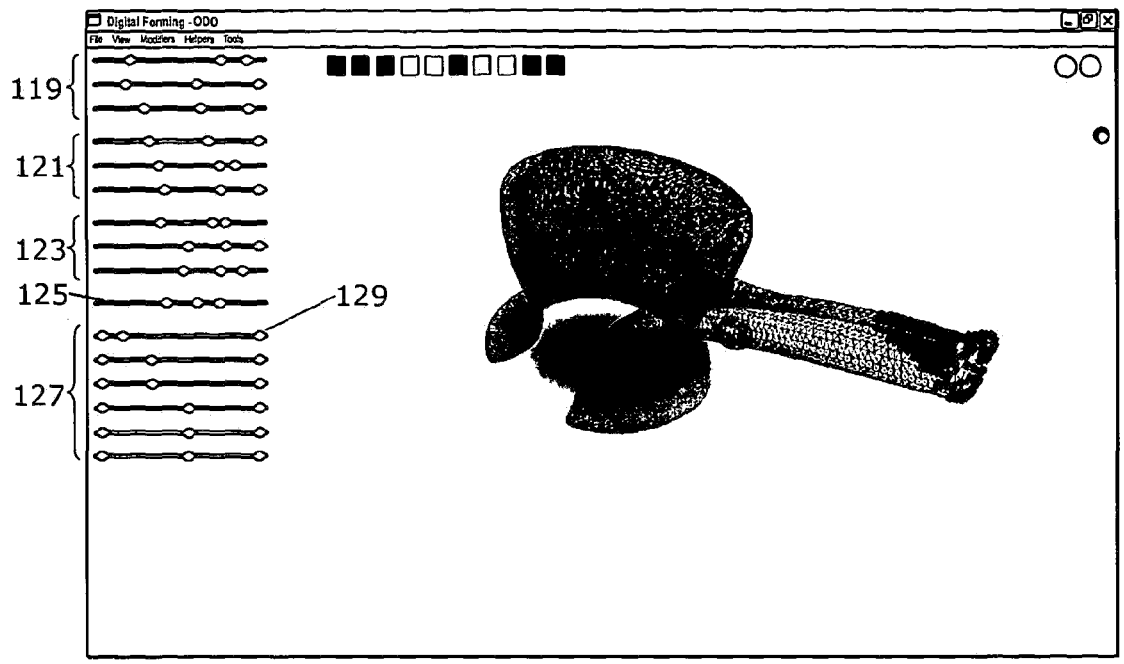
FIG. 16 is a screen shot of the GUI of FIG. 9 showing how an unconstrained object could be manipulated by a co-designer to distort the function of the object using the slider controls.

FIG. 16 shows an example of an 'unconstrained' modification to a design representation of an object. As is evident, the object's aesthetics have been ruined, it no longer functions correctly (as an egg cup/egg holder) and has multiple inverted vertices, which will result in a bad data file, which is not executable by a 3D printer.

User Interface

Figure 17A:
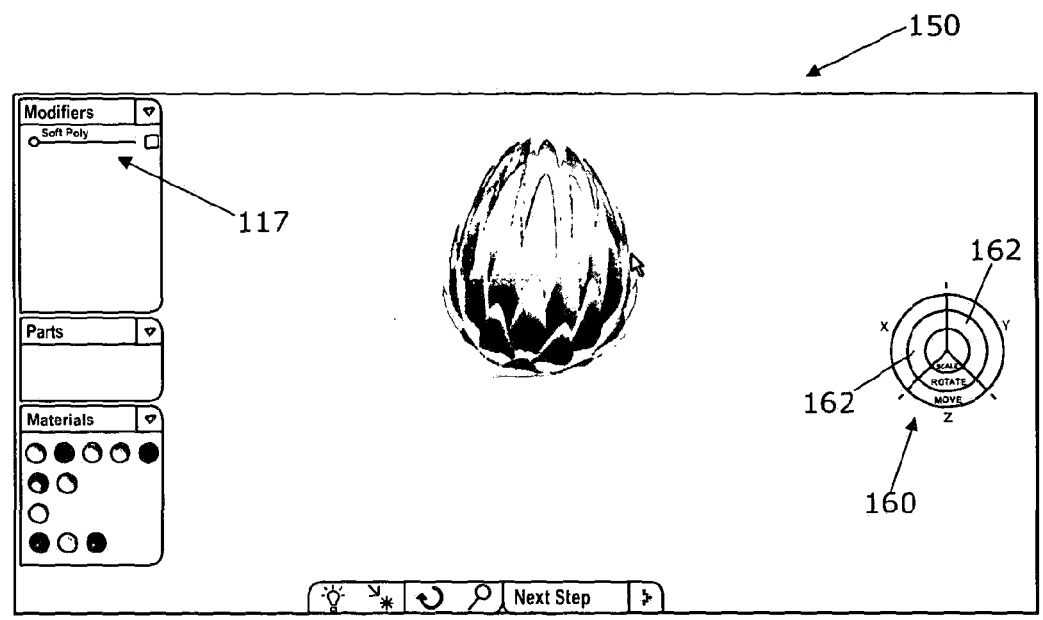
FIGS. 17a and 17b are a screen shots of a GUI according to a further embodiment of the present invention showing the use of a radar control for the manipulation of the constraints of the object.
Figure 17B:
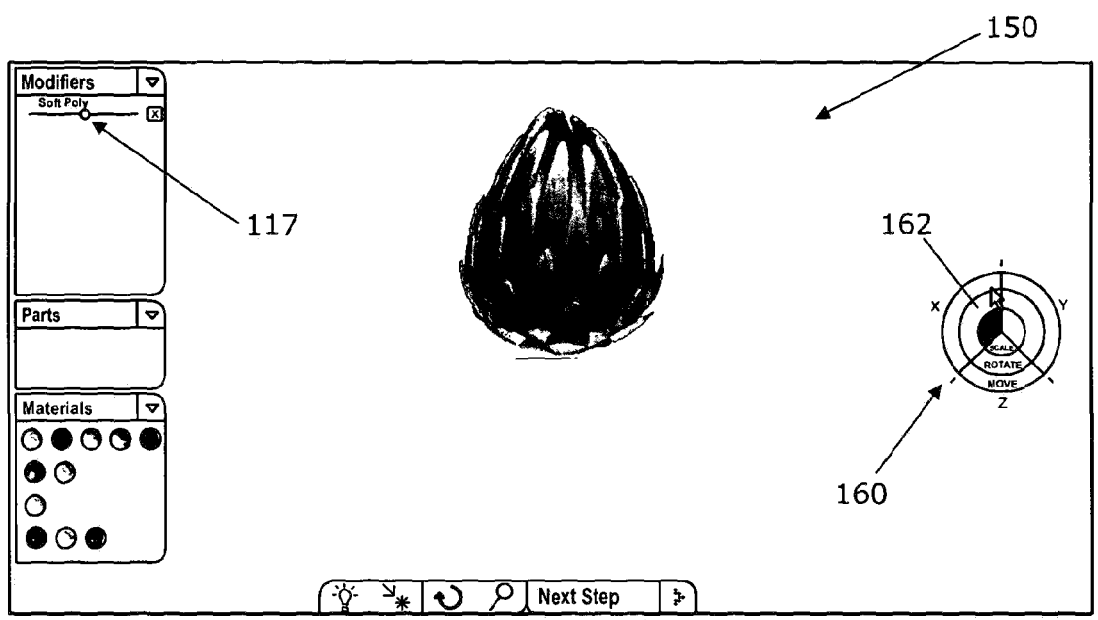

The connection between original designer and co-designer is not limited to the use of sliders as there are other embodiments, which have different ways of setting and working within constraints. The following description of a further embodiment, which is made with reference to FIGS. 17a and 17b is of the CODO application graphical user interface 150 where the modification tools 117 are no longer a set of sliders 117a but instead a 'radar' 160 where the selection of each segment 162 of the radar graphical device on the GUI 150 affects the object representation in different ways but is still restricted by the constraints of the original designer.

The radar interface is effectively another embodiment of the slider interface. Whereas in a slider, a slider button gets selected and moves from side to side, on the radar graphical device 160 the buttons stay put. By simply selecting them, they are highlighted and by then moving the designer's mouse away from the location of the button, the same effect is achieved as by moving the slider from side to side. This is a highly aesthetically pleasing embodiment of the controls. In the specific radar graphical device 160 the concentric circles represent the functions of 'move', 'rotate' and 'scale' from the outside circle to the centre.

Alternative Embodiments

Alternative embodiments of the present invention may include a physics module. The physics engine module may reside within the rapid manufacturing server 2 (FIG. 1). Once the raw 3D design object CAD file has been imported into the 3D raw design database 4, the physics module analyses the 3D design object and determines a set of design variable constraints required to maintain the functionality of the design object. For example, this may comprise performing a statics analysis of the geometry of the 3D design object. From such an analysis the physics module may determine the centre of mass of the object and accordingly may determine how certain modifications to the geometry affect stability of the object. On the basis of such an analysis the physics module may determine allowable modifications, which do not modify the centre of mass (and accordingly the stability of the object) to such an extent that the object loses its functionality. This functionality is especially important where the design object serves a practical purpose, such as a cup or other object requiring a degree of stability, and where modifications by a non-expert co-designer may inadvertently reduce the practical functionality of an object manufactured to the design.

The physics module may relate to a physics engine, which can simulate how an object with determined geometrical characteristics will behave. For example, most applications for developing computer animation include a physics engine, which simulate how a virtual object would behave in various real-life settings, such as the behaviour of an object having mass when subjected to a gravitational field. In other words, the physics engine provides a simulation of a physical system, and in particular may simulate rigid body dynamics and statics.

Furthermore, use of the physics module may also significantly simplify the determining of design constraints by the original designer. All design constraints related to preserving object functionality are processed by the physics module. The original designer only needs to consider constraints that preserve the aesthetic appeal of the design.

Finite Element Analysis (FEA) may also be used to simulate the effects original designer designated manipulations and/or modifications may have on the static and dynamic equilibrium of products manufactured to the design. Known algorithms may be used within the Physics module (not shown) to implement the FEA.

In yet a further alternative embodiment, the system 1 may also be provided with a module which analyses both the original designer's design and the co-designer's modified design for any logical inconsistencies present in the 3D polygon mesh associated with the design object. Any logical inconsistencies present in the finalised STL file may prevent the 3D printer from being able to print a product to the design. Accordingly, it is important to identify any logical inconsistencies present in the 3D polygon mesh before the finalised STL file is created. Effectively this is a form of identifying allowable manipulations and/or modifications of the 3D polygonal mesh of the design object which may lead to bad data within the a subsequently generated finalised STL file, and ultimately to unusable STL files.

Examples of logical inconsistencies in the 3D polygon mesh may relate to inverted polygons, holes, and bad edges. Identifying the presence of such logical inconsistencies is often very difficult for the original designer. Use of a 'logical inconsistency' module automates the task of identifying logical inconsistencies and significantly improves both the original designer's and co-designer's user experience.

Once an original designer has selected design constraints, the logical inconsistency module may simulate a selection of the allowable modifications within the designated constraints to identify any allowable design modification and/or manipulation, which may inadvertently result in the presence of such logical inconsistencies in the 3D polygonal mesh. Any identified problematic manipulations and/or modifications may be highlighted to the original designer, providing the designer with an opportunity to amend the designated design constraints to prevent the risk of a co-designer's modified design having such inconsistencies. Equally, rather than simulating only a subset of the allowable design modifications, the logical inconsistencies module may analyse and simulate every combination and permutation of allowable design manipulation and/or modification. Subsequent to this analysis and simulation, any manipulation and/or modification is highlighted, which may lead to logical inconsistencies in the 3D polygon mesh. Equally, the module may be adapted to automatically amend the original designer defined constraints to exclude any design modifications and/or manipulations, which may lead to logical inconsistencies.

Magics® is an example of a commercially available rapid prototyping application, which converts CAD files to STL files which may subsequently be read by a 3D printer. During the conversion process the application analyses the 3D polygon mesh associated with the CAD file to determine if any logical inconsistencies are present. Magics® may be used in conjunction with the present invention however, some further functionality for simulating the allowable modifications is required to avoid the original designer having to manually simulate all combinations of allowable modification with the application 14.

In preferred embodiment, the simulation, identification, and amending of allowable design constraints is automated by the logical inconsistency module (not shown). The module itself may be comprised anywhere within the system 1, within the rapid manufacturing server 2, or at the original designer terminal 10, and/or the co-designer terminal 12.

Having described particular preferred embodiments of the present invention, it is to be appreciated that the embodiments in question are exemplary only and that variations and modifications such as will occur to those possessed of the appropriate knowledge and skills may be made without departure from the spirit and scope of the invention as set forth in the appended claims.

The invention claimed is:

1. A collaborative method of generating a design representation of an object between a first user and a second user, the method comprising:
   receiving, by a computer system, from the first user a designation of a set of design object variables relating to different aspects of the design representation, wherein the design object variables represent physical attributes of an object represented by the design representation;
   receiving, by the computer system, from the first user a set of constraints for the set of design object variables, the constraints comprising a range of first user designated values for each of the designated object variables of the set;
   transmitting, by the computer system, to the second user using user terminal, the set of designated design object variables, the constraints for the set of design object variables, and the design representation via a communication network;
   enabling, at the user terminal, manipulation of the design representation, the enabling comprising transmitting, by the computer system, data enabling display of the design representation within a graphical user interface at the user terminal, the graphical user interface comprising one or more design manipulation tools presented as one or more icons within the graphical user interface, the design manipulation tools enabling selection of a value of the designated design object variables within the range of user designated values;
   receiving, by the computer system, from the user terminal, a selection of a particular value of a particular designated design object variable;
   updating, by the computer system, the design representation based on the selection of the particular value of the particular designated design object variable;
   transmitting, by the computer system, to the user terminal, data enabling display of a graphical representation of the design representation as specified by the user selection at the user terminal,
   compiling the results of the user manipulation of the design representation into a finalised design file and transmitting the same to a centralised data storage facility;
   receiving the finalised design file at the centralised data storage facility and storing the same in a central data store; and
   sending the finalised design file to a three-dimensional printer, the three-dimensional printer being arranged to manufacture a three-dimensional object in accordance with the finalised design file,
   wherein the computer system comprises a computer processor and an electronic memory storage device.

2. The method of claim 1, further comprising selecting a plurality of points of the design representation and grouping the selected points as a functional region of the design representation.

3. The method of claim 2, wherein the selecting and grouping steps comprise selecting and grouping a set of non-adjacent points of the design representation into the functional region.

4. The method of claim 2, wherein the selecting and grouping steps comprise selecting and grouping a set of adjacent points of the design representation into the functional region.

5. The method of claim 2, wherein the selecting and grouping steps are repeated to create a plurality of functional regions of the design representation and the method further comprises locking one of the functional regions to prevent any manipulation of this part of the design by the second user.

6. The method of claim 2, further comprising applying a fall-off weighting function to the selected functional region, the fall-off weighting function graduating the effects of any second user manipulation of the selected functional region to other regions of the design representation.

7. The method of claim 2, further comprising applying a dynamic skin function to the design representation, wherein the dynamic skin function enables another geometry to be imported and attached to each vertex within a group, to create a textured skin effect of the design representation.

8. The method of claim 2, further comprising applying an assembly function to the design representation, wherein the assembly function enables a pre-defined geometry to be attached to a selected point of the design representation.

9. The method of claim 2, further comprising applying a group poly function to the design representation, wherein the group poly function enables the user defined constraints to be applied to the specified region of the design representation.

10. The method of claim 2, wherein the set of constraints are specified by the first user, and comprise locking at least one of the set of design object variables, to prevent any manipulation at the user terminal of the locked design object variable.

11. The method of claim 2, wherein the design representation is a three-dimensional model of an object, represented by a polygon mesh, and the method further comprises importing, to the first user, a design representation of the object; and wherein the designation of the set of design object variables comprises selecting one or more polygon vertices comprised within the polygon mesh; and the set of constraints comprise a range of coordinate values for each of the one or more selected polygon vertices specified by the first user.

12. The method of claim 1, further comprising compiling the set of constraints and the first user designated set of design object variables into a constraints file and transmitting the same to the second user terminal.

13. The method of claim 1, further comprising displaying on a graphical user interface of a terminal associated with the first user, a graphical representation of the design representation, wherein the graphical user interface provides tools enabling the first user to specify the set of constraints and to designate the set of design object variables.

14. The method of claim 13, wherein the tools of the graphical user interface of the terminal associated with the first user comprise a set of slider icons, each slider relating to one design object variable and the amount of allowable movement of the slider representing the range of manipulation possible for the associated design object variable.

15. The method of claim 14, wherein each slider icon has variable limits which are adjustable by the first user to constrict the range of manipulation of the associated design object variable.

16. The method of claim 15, further comprising providing a local check box for at least one of the slider icons, the check box providing a way for the first user to lock the value of the design object variable to a particular amount.

17. The method of claim 14, further comprising providing a global check box for the design, the global check box providing a way for the first user to apply a global function to at least one aspect of the design, such as surface orientation.

18. The method of claim 1, further comprising presenting a graphical representation of the design representation using a graphical user interface at the user terminal.

19. The method of claim 1, further comprising:
automatically determining a global set of design variable modification constraints required to maintain the functionality of the design representation using a physics module, and
applying these global modification constraints to the set of design object variables to prevent modifications being made which prevent the design representation from performing its desired function.

20. The method of claim 19, wherein automatically determining the global set of design variable modification constraints comprises using a physics engine, the physics engine being able to simulate the behaviour of an object with a specified geometry and to determine whether the specified geometry will be stable within the environment.

21. The method of claim 1, further comprising analysing the set of design object variables and the set of constraints for a given design representation as designated by the first user or the selection of the particular values of the designated object variables of a given design representation as selected by the second user at the user terminal to determine any logical inconsistencies which may prevent automated machine creation of an object in accordance with the design.

\* \* \* \* \*